May 6, 1941.　　　　W. FERRIS　　　　2,240,901
HYDRAULIC TRANSMISSION
Filed Feb. 20, 1936　　　17 Sheets-Sheet 1
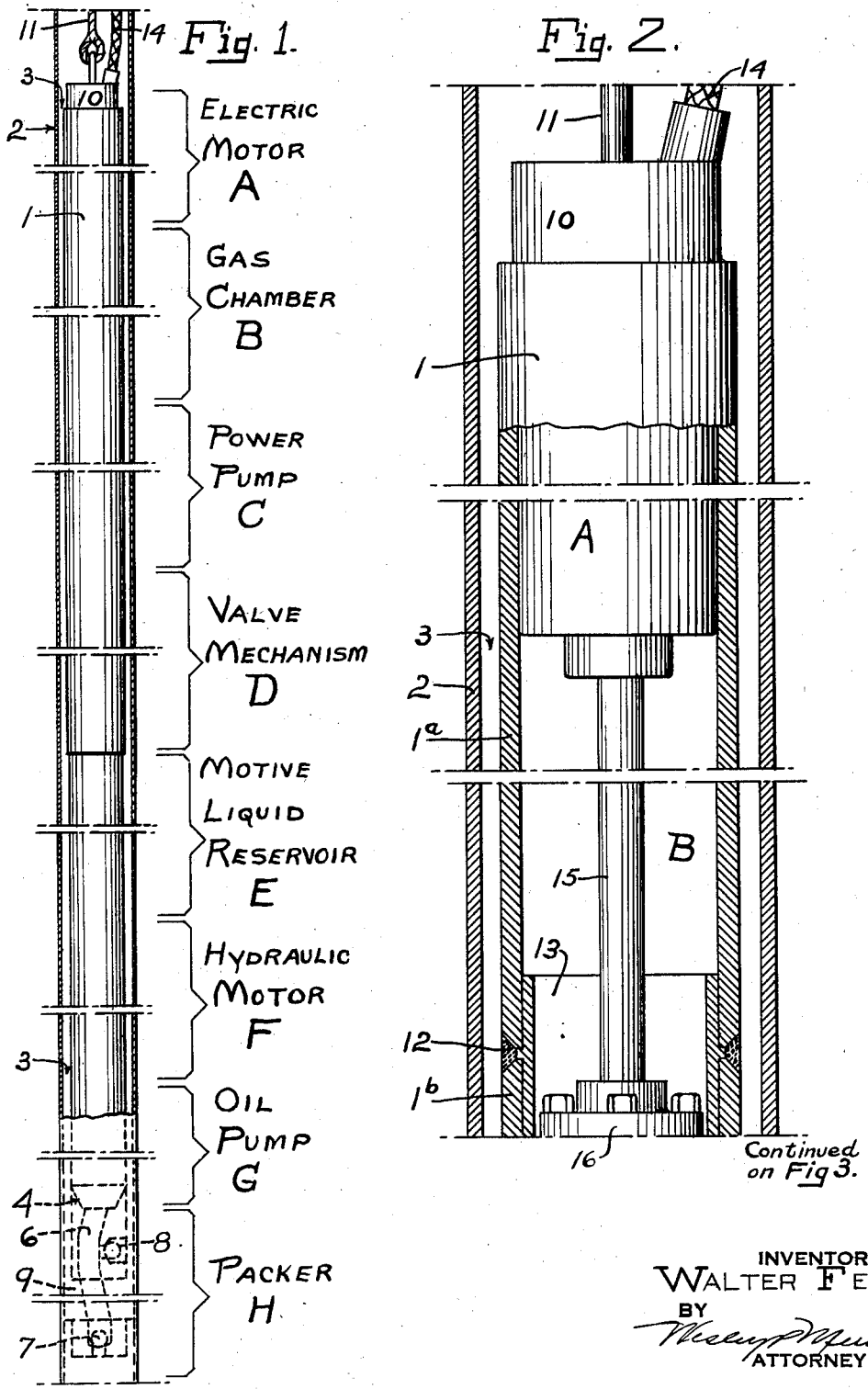
INVENTOR
WALTER FERRIS
BY
ATTORNEY

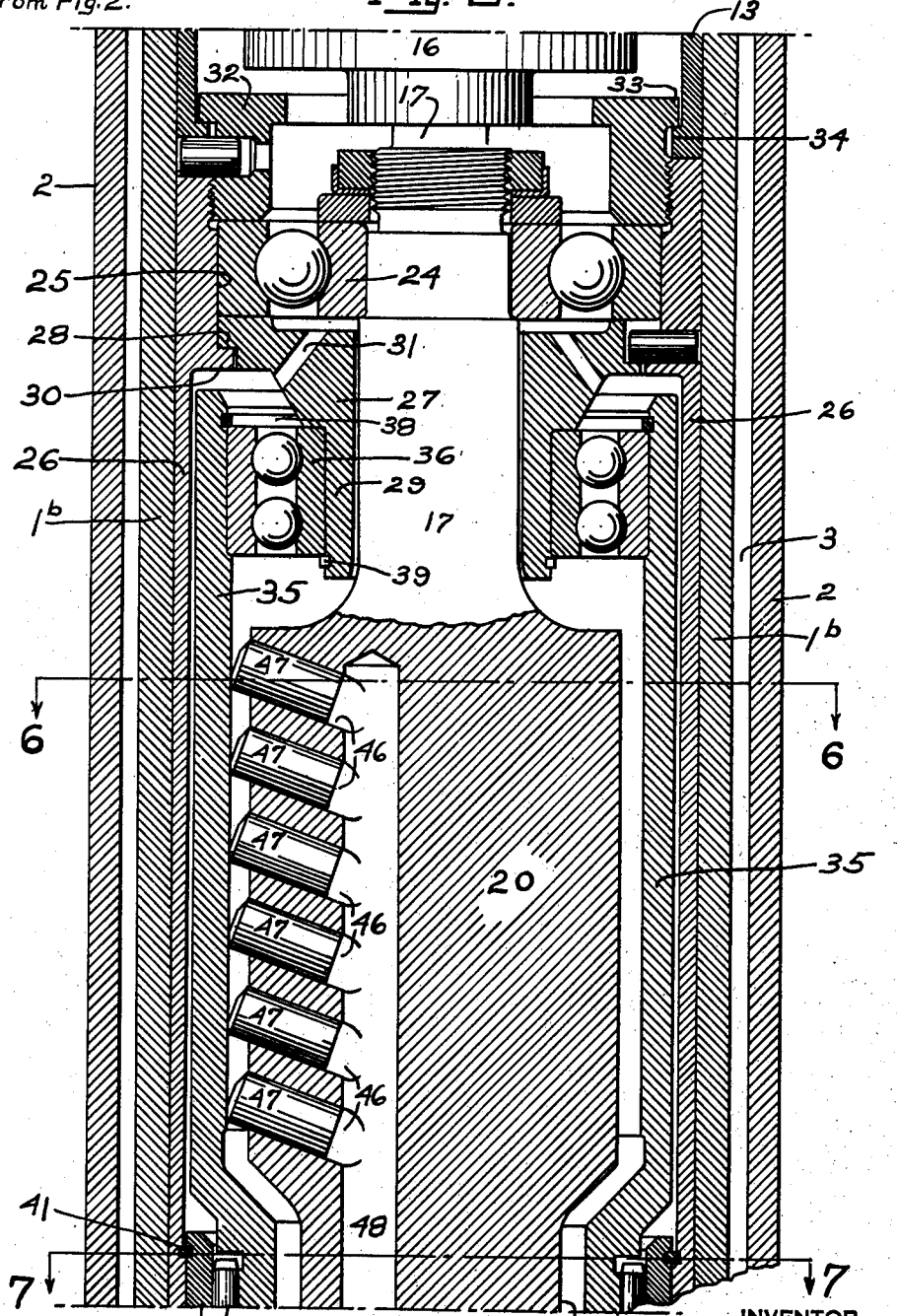

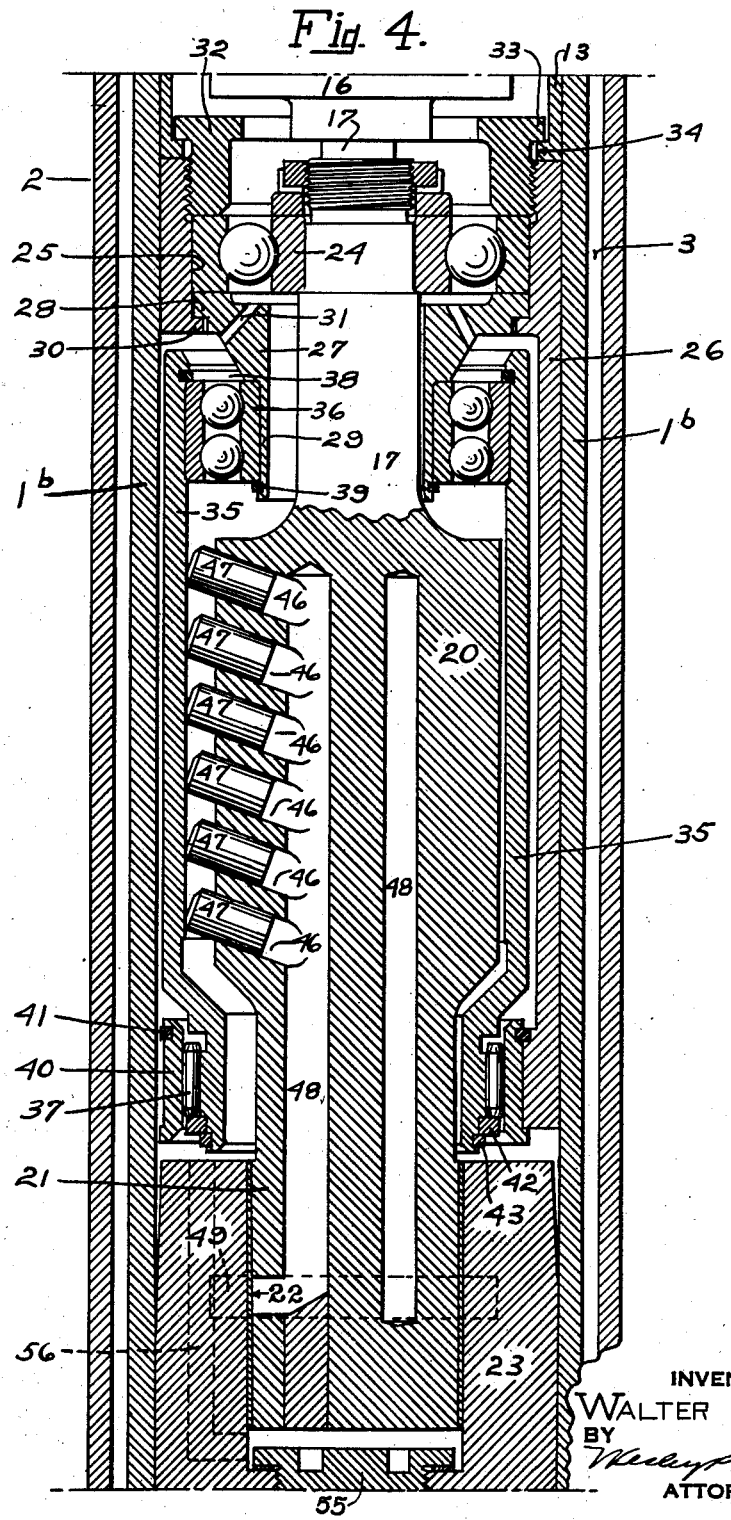

May 6, 1941.  W. FERRIS  2,240,901
HYDRAULIC TRANSMISSION
Filed Feb. 20, 1936  17 Sheets-Sheet 4

INVENTOR
WALTER FERRIS
BY
ATTORNEY

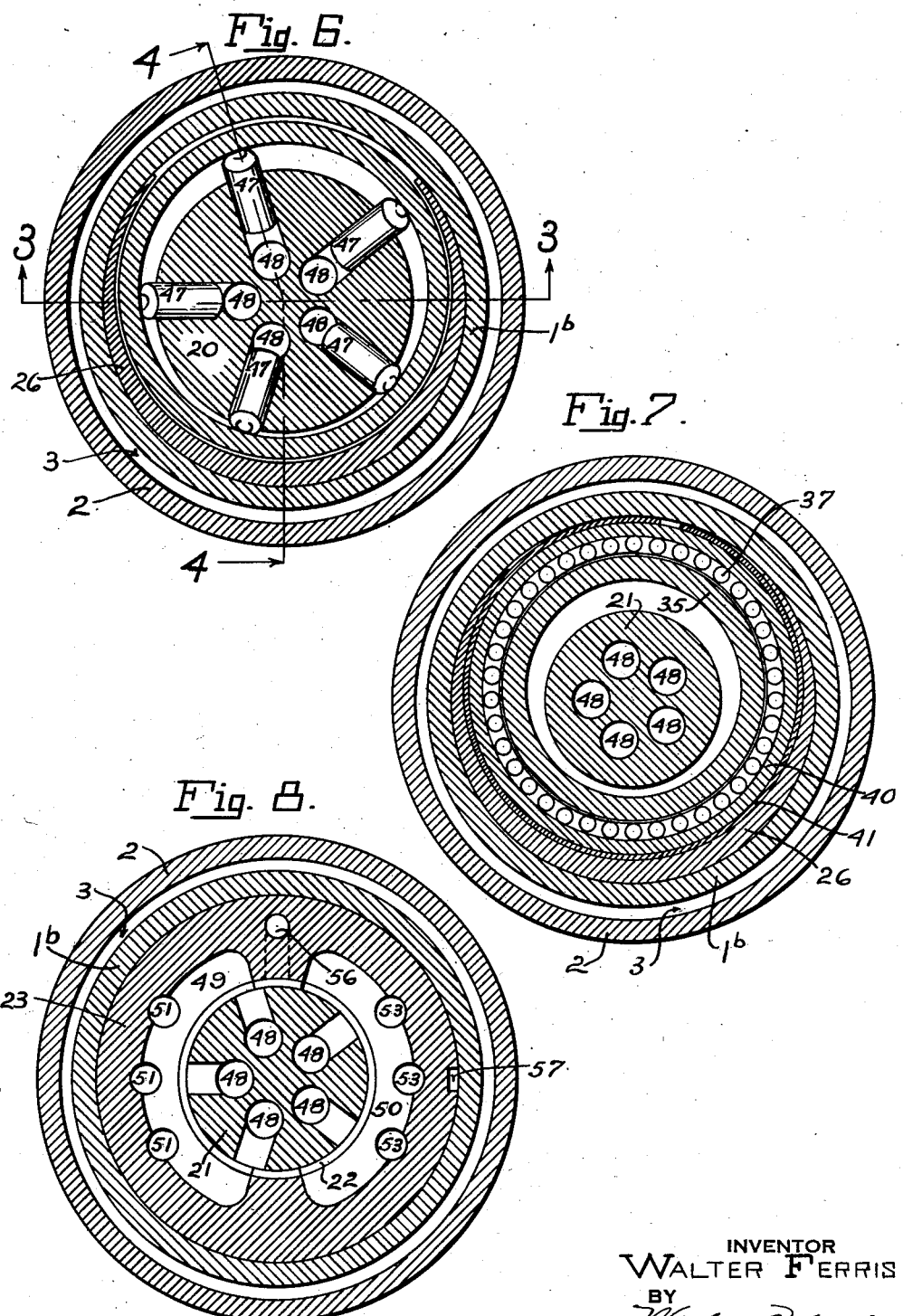

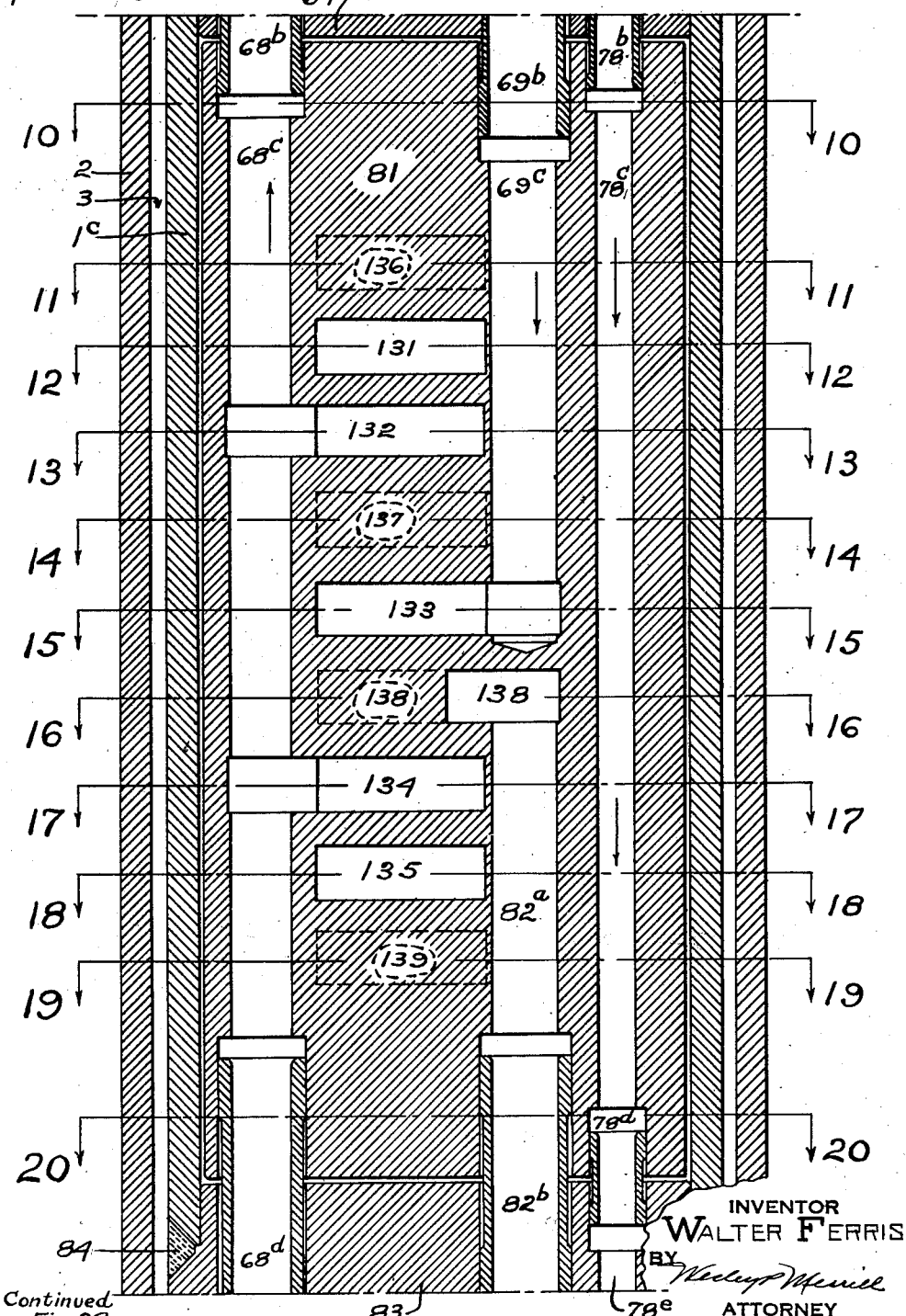

May 6, 1941.  W. FERRIS  2,240,901
HYDRAULIC TRANSMISSION
Filed Feb. 20, 1936  17 Sheets-Sheet 7
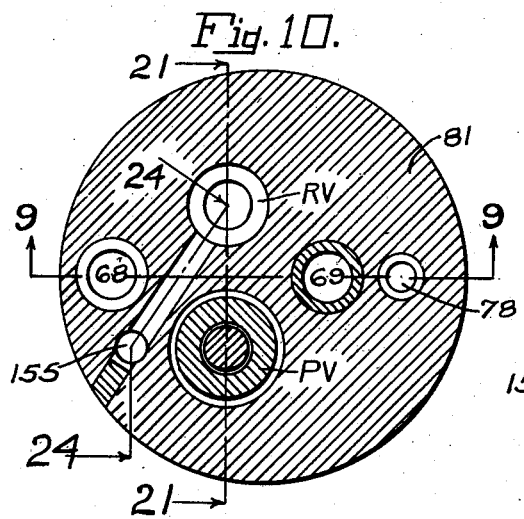
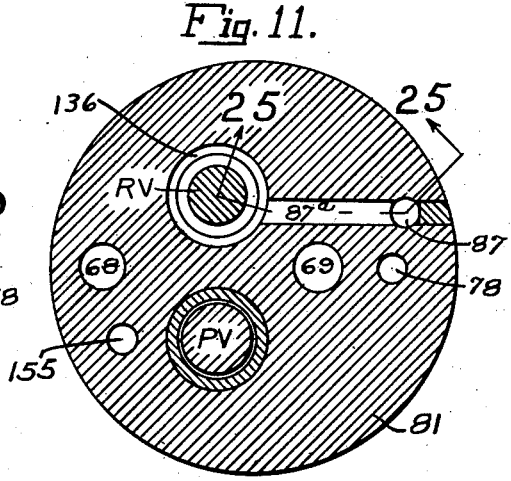
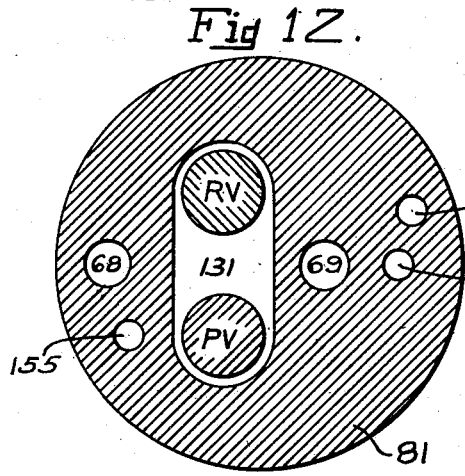
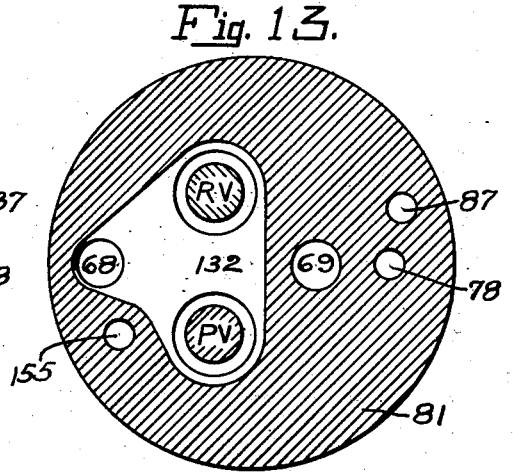
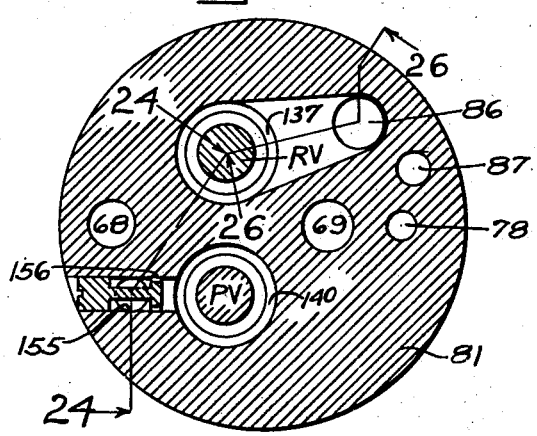
INVENTOR
WALTER FERRIS
BY
ATTORNEY May 6, 1941. W. FERRIS 2,240,901
HYDRAULIC TRANSMISSION
Filed Feb. 20, 1936 17 Sheets-Sheet 8
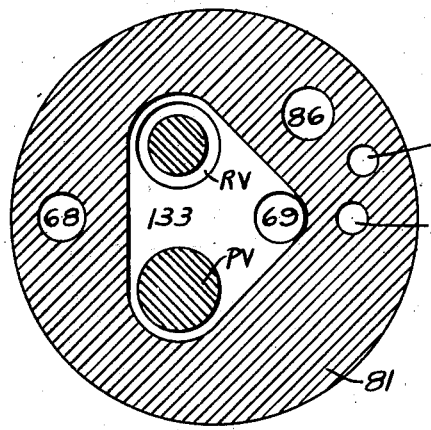
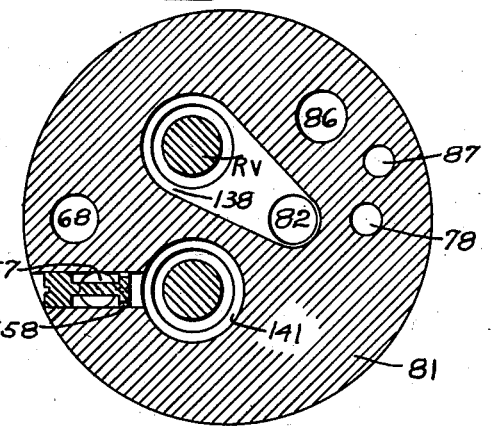
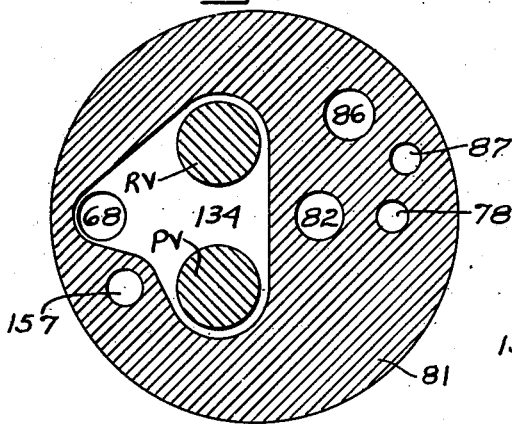
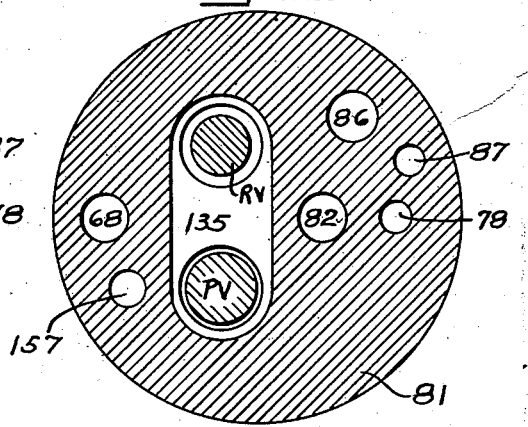
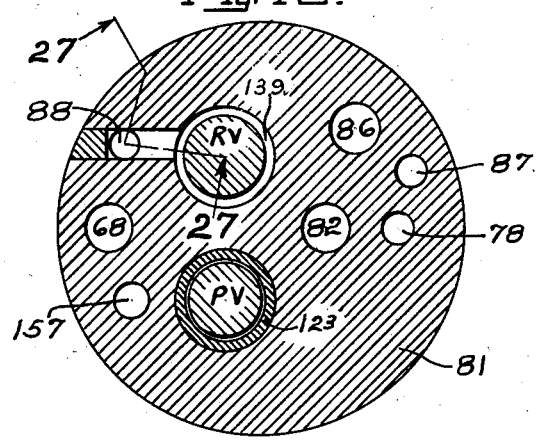
INVENTOR
WALTER FERRIS
BY
ATTORNEY May 6, 1941.  W. FERRIS  2,240,901
HYDRAULIC TRANSMISSION
Filed Feb. 20, 1936  17 Sheets-Sheet 9
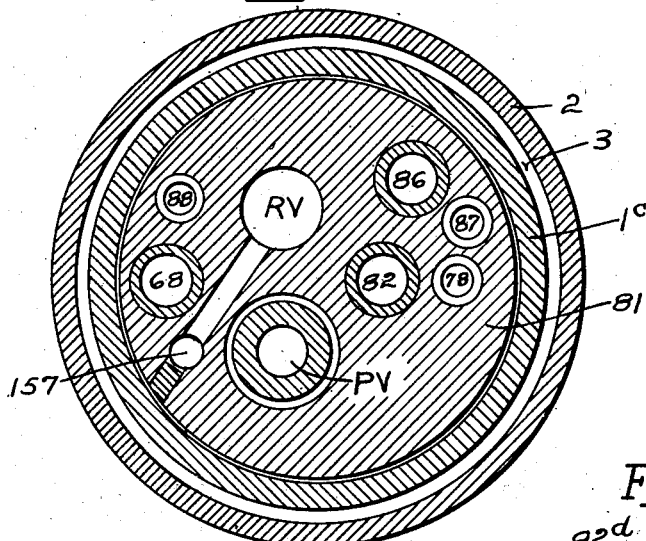
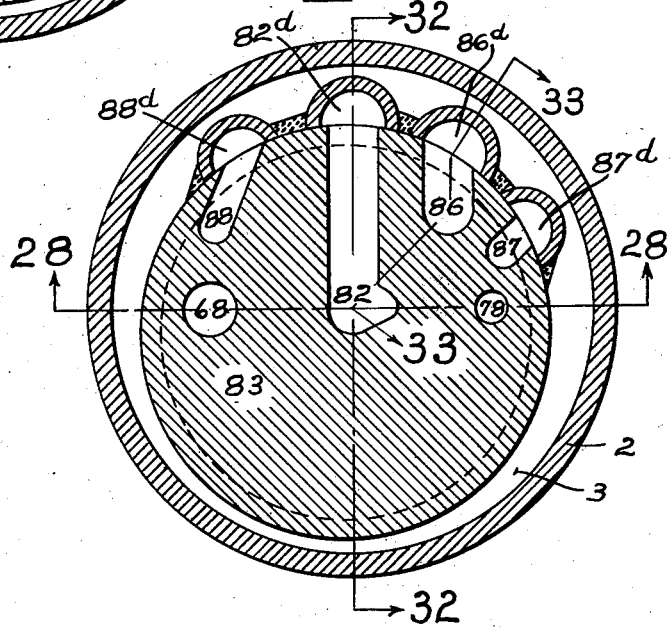
INVENTOR
WALTER FERRIS
BY
ATTORNEY May 6, 1941.   W. FERRIS   2,240,901
HYDRAULIC TRANSMISSION
Filed Feb. 20, 1936   17 Sheets-Sheet 10

INVENTOR
WALTER FERRIS
BY
Wesley P Merrill
ATTORNEY

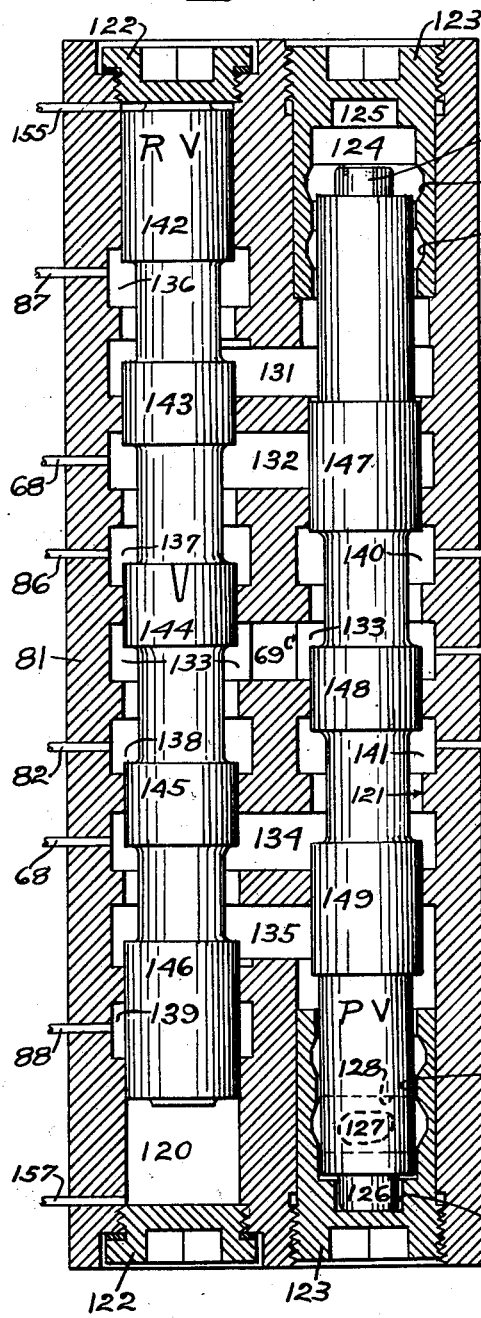
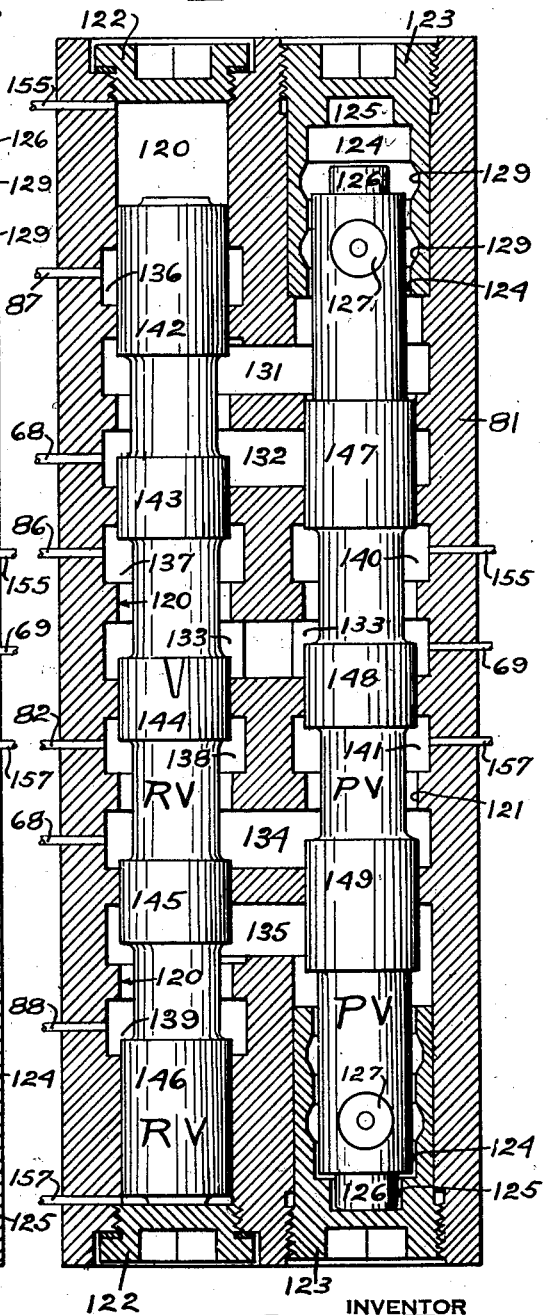

May 6, 1941.　　　　W. FERRIS　　　　2,240,901
HYDRAULIC TRANSMISSION
Filed Feb. 20, 1936　　　17 Sheets-Sheet 12
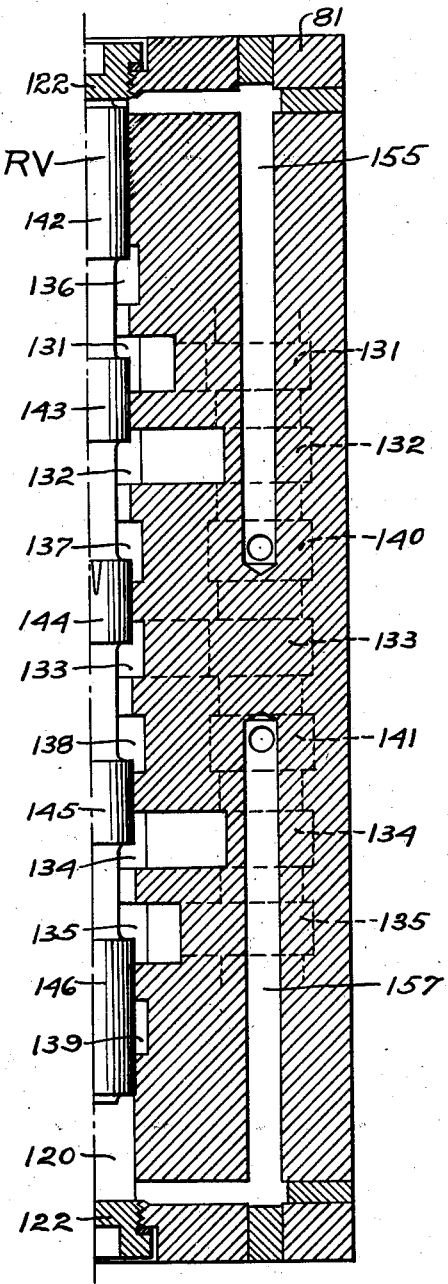
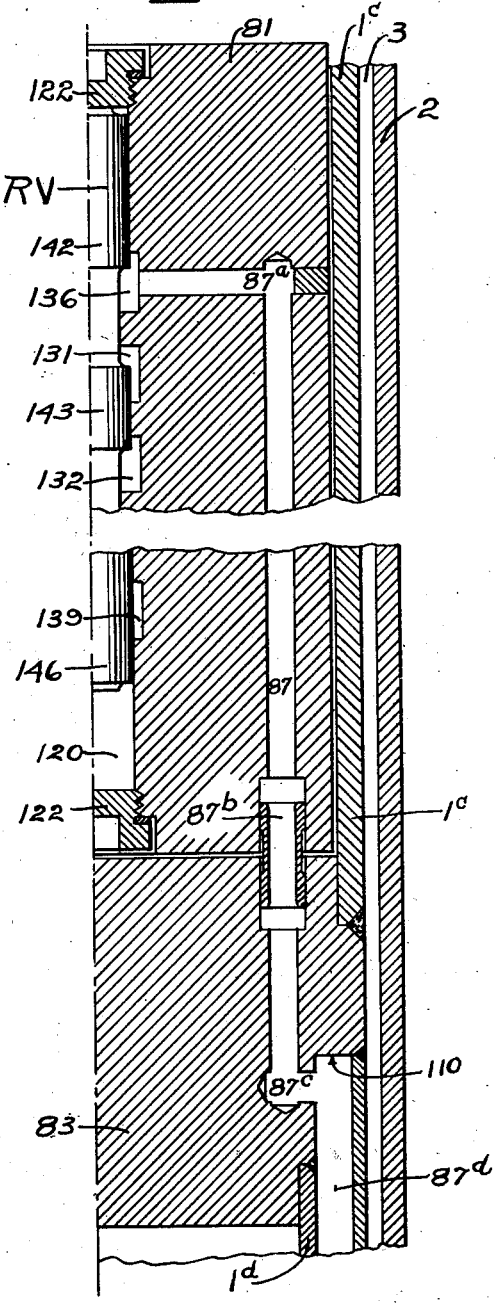
INVENTOR
WALTER FERRIS
BY
ATTORNEY May 6, 1941.  W. FERRIS  2,240,901
HYDRAULIC TRANSMISSION
Filed Feb. 20, 1936  17 Sheets-Sheet 13

INVENTOR
WALTER FERRIS
BY
Wesley P. Merrill
ATTORNEY

May 6, 1941.  W. FERRIS  2,240,901
HYDRAULIC TRANSMISSION
Filed Feb. 20, 1936  17 Sheets-Sheet 14

INVENTOR
WALTER FERRIS
BY
ATTORNEY

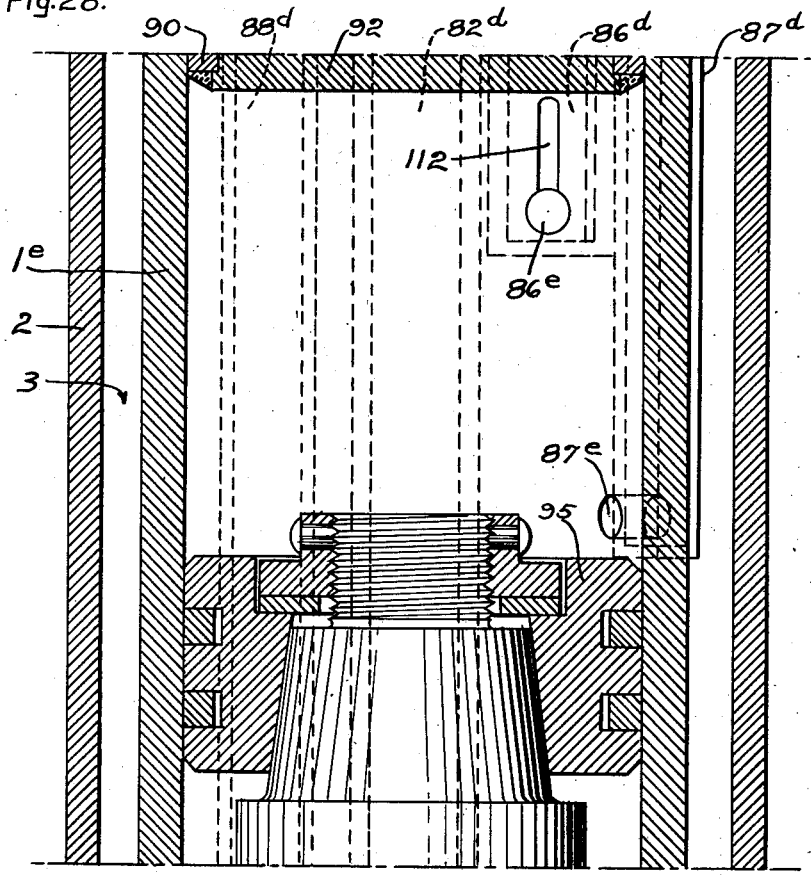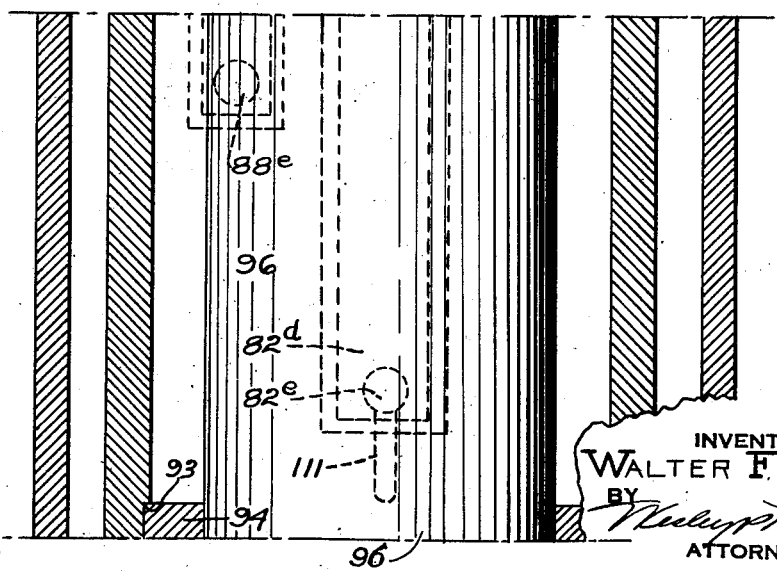

May 6, 1941. W. FERRIS 2,240,901
HYDRAULIC TRANSMISSION
Filed Feb. 20, 1936 17 Sheets-Sheet 16

INVENTOR
WALTER FERRIS
BY
ATTORNEY

May 6, 1941.    W. FERRIS    2,240,901
HYDRAULIC TRANSMISSION
Filed Feb. 20, 1936    17 Sheets-Sheet 17
Fig. 32.
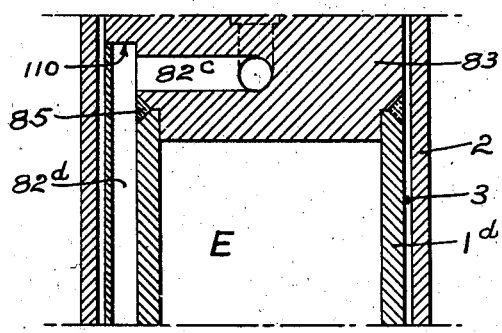
Fig. 33.
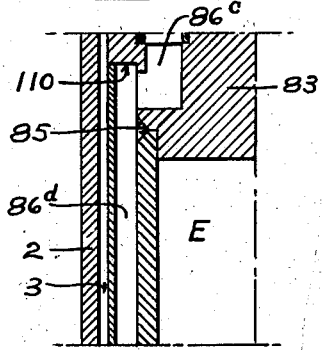
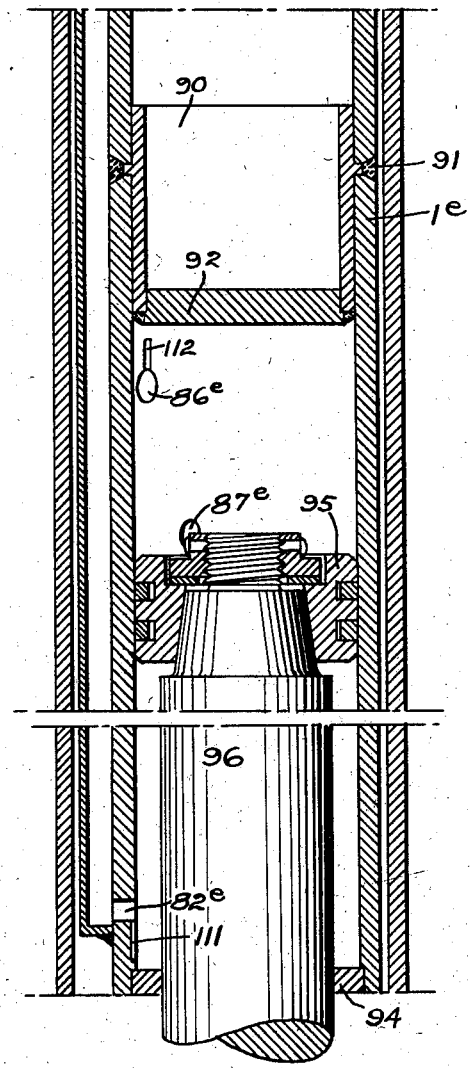
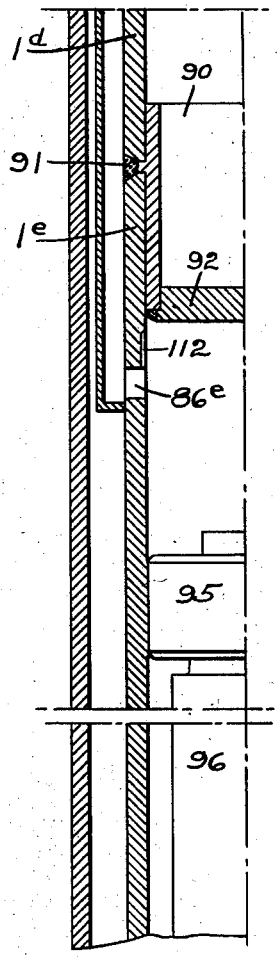
INVENTOR
WALTER FERRIS
BY
ATTORNEY Patented May 6, 1941

2,240,901

UNITED STATES PATENT OFFICE 2,240,901

HYDRAULIC TRANSMISSION

Walter Ferris, Milwaukee, Wis., assignor to The Oilgear Company, Milwaukee, Wis., a corporation of Wisconsin Application February 20, 1936, Serial No. 64,901

20 Claims. (Cl. 60—52)

This invention relates to hydraulic transmissions of the type having a hydraulic motor, a pump for supplying liquid to the motor to drive it and automatic valve mechanism for controlling the operation of the motor.

An object of the invention is to provide a hydraulic transmission of the above type which is small enough in diameter to be lowered into the casing of an oil well.

Another object is to provide a small diameter transmission which is capable of operating continuously over long periods of time without requiring to be serviced.

Other objects and advantages will appear from the following description of a hydraulic transmission forming part of a deep well pumping apparatus which includes a reciprocating hydraulic motor for operating a crude oil pump, a power pump for supplying motive liquid to the motor to drive it, valve mechanism for effecting automatic reversal of the motor, a reservoir for supplying liquid to the power pump, an electric motor for driving the power pump, and a gas filled chamber for preventing liquid from entering the electric motor, all of which are arranged within a fluid tight casing as shown in the accompanying drawings in which the views are as follows:

Fig. 1 is a schematic drawing showing the relation of the several parts of the apparatus to each other, a section of each part being broken away or omitted in order that the view may be made on a larger scale.

Fig. 3 is a central vertical section through the upper part of the power pump which is arranged immediately below the gas chamber shown in Fig. 2, the view being taken on the line 3—3 of Fig. 6.

Fig. 4 is a central vertical section taken approximately at right angles to Fig. 3 as indicated by the irregular line 4—4 of Fig. 6.

Fig. 6 is a section plan view taken on the line 6—6 of Fig. 3.

Fig. 7 is a sectional plan view taken on the line 7—7 of Fig. 3.

Fig. 8 is a sectional plan view taken on the line 8—8 of Fig. 5.

Fig. 9 is a central vertical section through the valve mechanism, the view being taken on the line 9—9 of Fig. 10 and immediately below that part of the apparatus shown in Fig. 5.

Fig. 10 is a sectional plan view taken on the line 10—10 of Fig. 9.

Fig. 11 is a sectional plan view taken on the line 11—11 of Fig. 9.

Fig. 12 is a sectional plan view taken on the line 12—12 of Fig. 9.

Fig. 13 is a sectional plan view taken on the line 13—13 of Fig. 9.

Fig. 14 is a sectional plan view taken on the line 14—14 of Fig. 9.

Fig. 15 is a sectional plan view taken on the line 15—15 of Fig. 9.

Fig. 16 is a sectional plan view taken on the line 16—16 of Fig. 9.

Fig. 17 is a sectional plan view taken on the line 17—17 of Fig. 9.

Fig. 18 is a sectional plan view taken on the line 18—18 of Fig. 9.

Fig. 19 is a sectional plan view taken on the line 19—19 of Fig. 9.

Fig. 20 is a sectional view taken on the line 20—20 of Fig. 9.

Fig. 22 is a view similar to Fig. 21 but showing the pilot and reversing valves in the positions occupied just before the hydraulic motor completes an up-stroke.

Fig. 23 is a view similar to Fig. 22 but showing the reversing valve in position to initiate a down-stroke of the hydraulic motor.

Fig. 24 is a vertical section taken on the irregular line 24—24 of Figs. 10 and 14.

Fig. 25 is a vertical section taken on the irregular line 25—25 of Fig. 11.

Fig. 28 is a central vertical section of that part of the apparatus immediately below the valve mechanism shown in Fig. 9, the view being taken on the line 28—28 of Fig. 29 and showing certain connections between the valve mechanism and the reservoir.

Fig. 29 is a sectional plan view taken on the line 29—29 of Fig. 28.

Fig. 30 is a central vertical section of that part of the apparatus immediately below that part shown in Fig. 28, the view being taken on the same plane as Fig. 28 and showing the hydraulic motor.

Fig. 32 is a vertical section taken on the line 32—32 of Fig. 29.

Fig. 33 is a vertical section taken on the irregular line 33—33 of Fig. 29.

Figure 5:
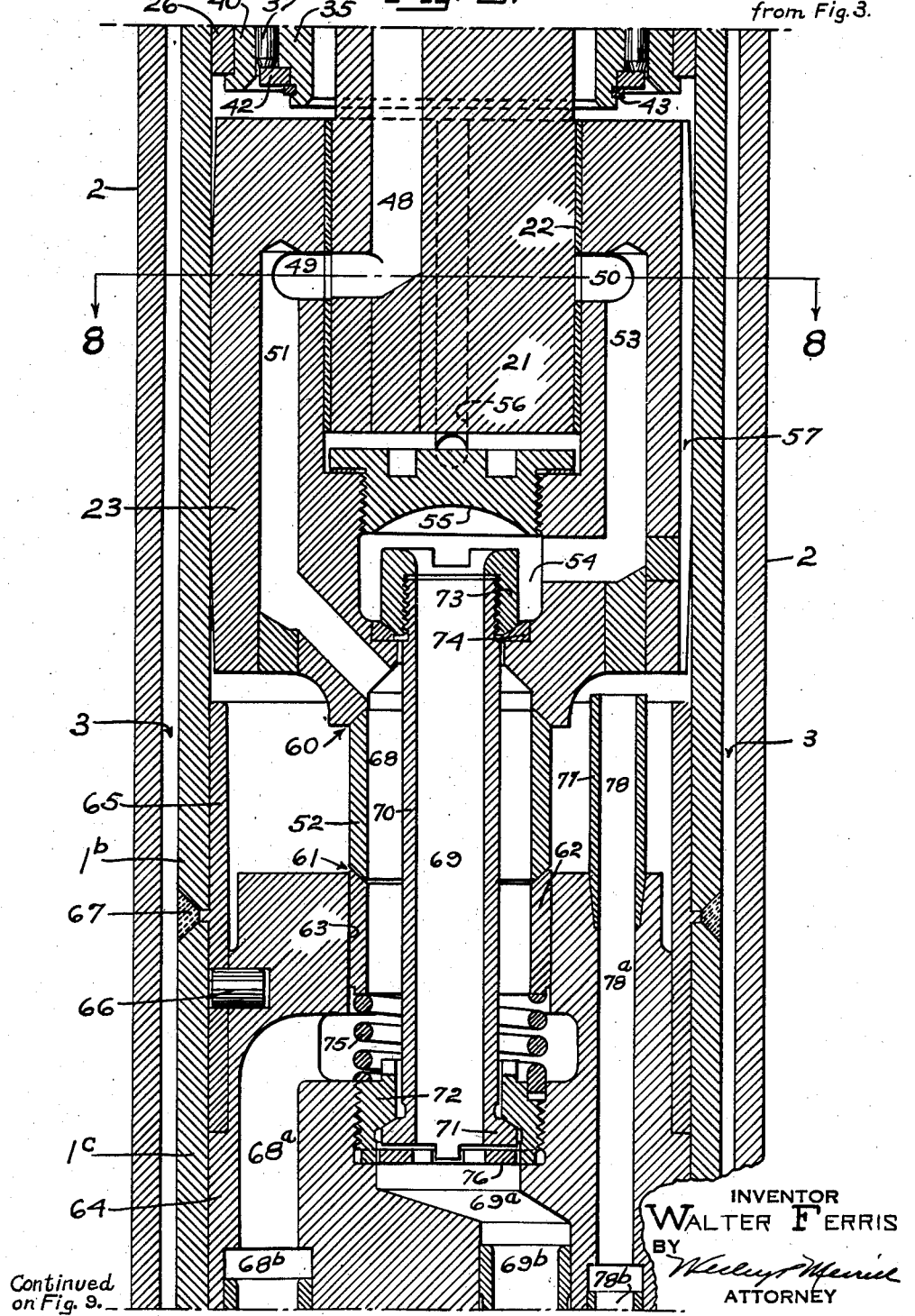
Fig. 5 is a central vertical section through the lower part of the power pump and shows the fluid channels which connect the pump to the valve mechanism, the view being taken in the same plane as Fig. 3.

As shown schematically in Fig. 1, the pumping apparatus has its mechanism arranged within an elongated fluid tight housing 1 which contains an elongated electric motor A, a gas chamber B, a power pump C, a valve mechanism D, a reservoir E for motive liquid, a hydraulic motor F and an oil pump G, the valves for pump G being arranged in a packer H.

Housing 1, which is smaller in diameter than the casing 2 of the oil well in order to provide a space 3 between the housing and the casing through which crude oil may be pumped from the well, is connected by means of a slip joint 4 to packer H which is fixed in casing 2 at or near the bottom thereof and supports at least a part of the weight of the apparatus.

Packer H has not been illustrated nor described in detail for the reason that such packers are well known and no part of the present invention resides therein. It is deemed sufficient to state that, as shown schematically in Fig. 1, it has a passage 6 which provides communication between the bottom of the well and the interior of housing 1, a valve 7 which is arranged in the lower part of passage 6 and permits liquid to flow from the well into passage 6 but prevents it from flowing in the opposite direction, a valve 8 which is arranged in the side of passage 6 near the upper end thereof and permits liquid to flow from passage 6 into space 3 but prevents it from flowing in the opposite direction, and a portion 9 which is arranged below valve 8 and is expansible into contact with the wall of casing 2 to support the packer in the casing and to prevent liquid from flowing past it except through passage 6.

The arrangement is such that, when pump G makes a suction stroke, oil from below packer H will flow through valve 7 and passage 6 into pump G and, when pump G makes a power stroke, it will eject oil through valve 8 into space 3.

Housing 1 consists of several sections which have been indicated by the reference numeral 1 with the exponents a, b, c, d, e, f and g added.

Figure 2B:
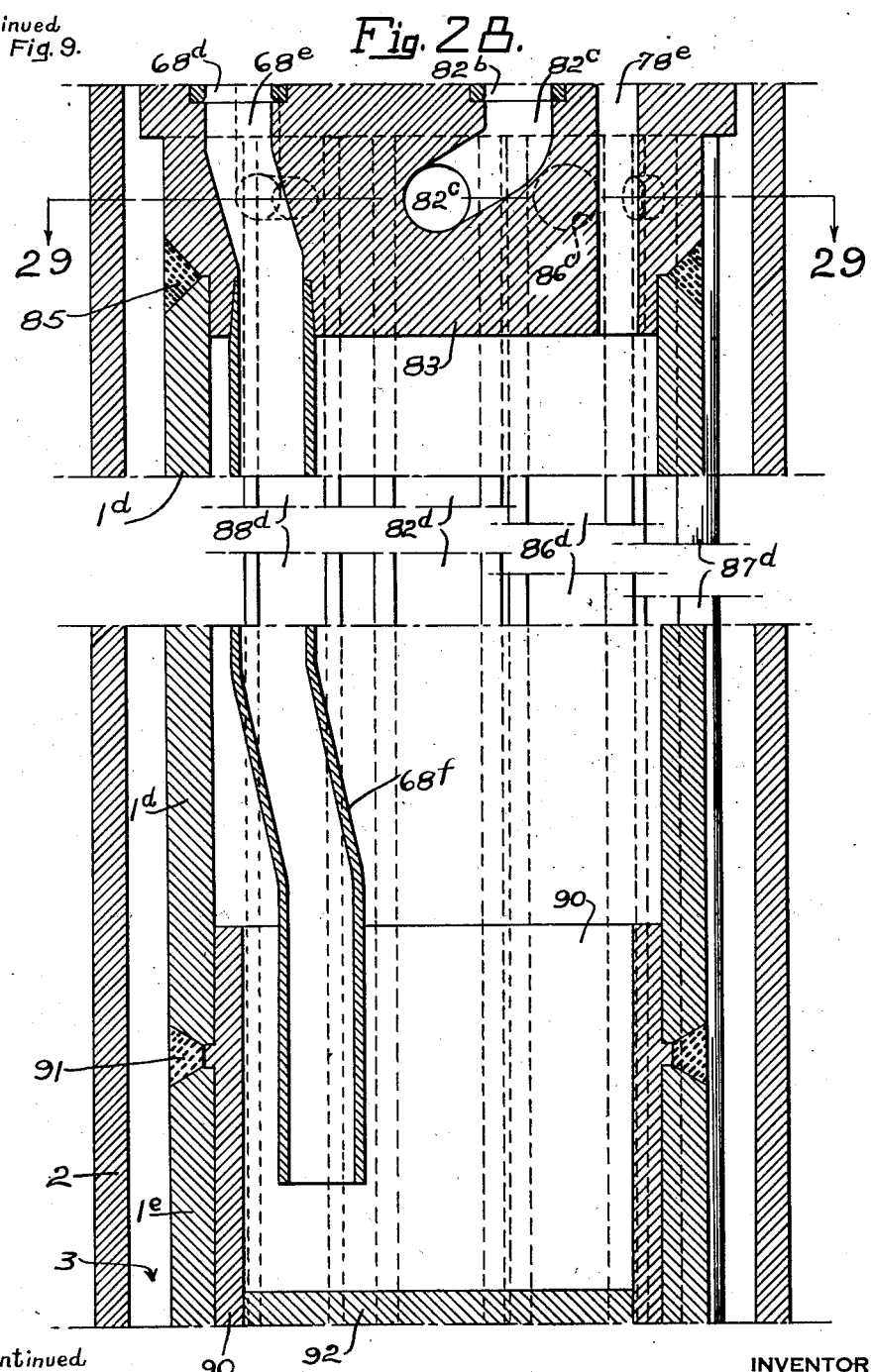
Fig. 2 is in part an elevation and in part a sectional view of that part of the housing which contains the electric motor and the upper part of a gas chamber.

The upper housing section 1ᵃ is substantially a plain tube sealed at its upper end by a cap 10 which has a cable 11 attached thereto for raising and lowering the apparatus within casing 2. The lower end of section 1ᵃ is connected to and forms a fluid tight joint with the upper end of the tubular second section 1ᵇ. As shown in Fig. 2, the adjacent ends of sections 1ᵃ and 1ᵇ are joined by a weld 12 to each other and to a splice ring 13 which is closely fitted therein. This splice ring facilitates the welding, strengthens the joint, and is replaced by a new splice ring should it be necessary to cut the original weld and reweld the joint.

Electric motor A is fixed in the upper end of section 1ᵃ and adapted to be connected to a power circuit by means of an electric cable 14 which extends through cap 10 and makes a fluid tight joint therewith. The shaft 15 of motor A is connected by means of a coupling 16 to the shaft 17 of power pump C which is arranged inside section 1ᵇ.

The space between the lower end of motor A and the upper end of pump C constitutes a gas chamber B through which shafts 15 and 17 extend and which contains a non-explosive gas under pressure. This gas fills the open spaces in motor A and power pump C and prevents oil from entering the same, thereby preventing the frictional loss that would be caused by churning the oil.

*Figs. 3 to 8*

Pump C, which is of the type disclosed in Patent No. 2,105,454, is provided with a rotatable cylinder barrel 20 which rotates upon an axis coincident with the axis of housing 1. Cylinder barrel 20 is connected at its upper end to shaft 17, as by being formed integral therewith, and it is provided at its lower end with a valve shaft or pintle 21 which is also shown as being formed integral therewith.

Pintle 21 is closely fitted for rotation in a bearing bushing 22 fixed in a valve body 23 which is fitted in housing section 1ᵇ below cylinder barrel 20. Valve body 23 is circular in cross section and is externally slightly arcuate in longitudinal section so that it may adjust itself upon pintle 21 by rocking slightly in housing section 1ᵇ.

Cylinder barrel 20 is rotatably supported by a ball thrust bearing 24 having its inner race fixed upon shaft 17 and its outer race fitted in a concentric bore 25 formed in the upper part of a sleeve 26 which is closely fitted in housing section 1ᵇ and has its upper end in contact with the lower end of splice ring 13.

Shaft 17 extends through but out of contact with a bearing support 27 consisting of an upper circular flange 28, which is concentric with bore 25 and housing 1, and a depending hub 29 which is eccentric thereto as shown in Fig. 4. Flange 28 is fitted in bore 25 and rests upon an internal annular flange 30 which is formed in sleeve 26 at the bottom of bore 25.

Bearing support 27 has a plurality of holes 31 extending through it to permit liquid to drain from above and to permit the gas pressure prevailing in chamber B to extend into section 1ᵇ.

The outer race of bearing 24 rests upon flange 28 and is held in firm engagement therewith by a ring nut 32 which is threaded into the upper end of sleeve 26 and provided with an external annular flange 33 to engage an internal annular flange 34 formed on the lower end of splice ring 13. Ring nut 32 holds the upper end of sleeve 26 against the lower end of splice ring 13 and is prevented from becoming unscrewed by a pin arranged in it and extending into a hole formed partly in splice ring 13 and partly in sleeve 26.

The portion of sleeve 26 below flange 30 is eccentric and has arranged therein a substantially cylindrical thrust member or drum 35 which has cylinder barrel 20 arranged therein. Drum 35 is supported at its upper end by a radial and thrust ball bearing 36 carried by the hub 29 of bearing support 27 and at its lower end by a roller bearing 37 arranged in the lower end of sleeve 26. Since hub 29 and the lower part of sleeve 26 are eccentric, as shown in Figs. 4, 6 and 7, drum 35 is supported for rotation upon an axis which is offset from the axis of cylinder barrel 20.

As shown, thrust bearing 36 has its outer race fitted in the upper end of drum 35 and retained in position by a snap ring 38 and its inner race fitted on hub 29 and retained in position by a snap ring 39. Bearing 37 is shown as having its outer race 40 fitted in the lower end of sleeve 26 and retained therein by a snap ring 41, its inner race formed integral with the lower end of drum 35 which is reduced in diameter, and its rollers retained in position by a keeper ring 42 arranged upon the lower end of drum 35 and retained in position by a snap ring 43.

Cylinder barrel 20 is provided with a plurality of cylinders 46 which are inclined to the radii of the cylinder barrel as shown in Figs. 3 and 6. A piston 47 is fitted in each cylinder 46 and has its outer end or head provided with an arcuate contact face which engages the inner peripheral surface of drum 35.

The arrangement is such that, when cylinder barrel 20 is rotated, drum 35 will be rotated in unison therewith by the frictional contact of the piston heads with the inner surface of the drum and, since drum 35 is eccentric to cylinder barrel 20, each piston 47 will be forced inward by the drum during one half-revolution of the cylinder barrel and be permitted to be moved outward by centrifugal force during the other half-revolution.

The linear speed of each piston head will increase as the piston moves outward and decrease as the piston moves inward. Therefore, since drum 35 is rotated substantially in synchronism with cylinder barrel 20 by its contact with the heads of all of the pistons, the head of each piston will move alternately faster and slower than a given point on the inner peripheral surface of drum 35 so that the piston head is caused to roll along the inner surface of drum 35 first in one direction and then the other, thereby causing the piston to rotate as it reciprocates.

Cylinders 46 are arranged in a plurality of rows and the cylinders in each row communicate with a passage 48 which is formed in cylinder barrel 20 and in pintle 21 and extends for the greater part of its length parallel to the axes thereof as shown in Figs. 3 and 6. The lower end of each passage 48 extends radially outward to communicate alternately with two segmental ports 49 and 50 which are formed diametrically opposite each other in valve body 23 and its bushing 22 as shown in Figs. 5 and 8. Port 49 is connected to reservoir E through passages to be presently described and port 50 is connected through valve mechanism D to hydraulic motor F.

Throughout the greater part of the half revolution during which the pistons 47 in one row of cylinder 46 are moving outward, the passage 48 connected to that row of cylinders is open to port 49 so that the outward moving pistons may draw liquid into their cylinders and, during the other half-revolution, that passage 48 is open to port 50 so that the inward moving pistons will force liquid from their cylinders through the connecting channels and valves to motor F to drive it.

Port 49 communicates with a plurality of channels 51 which extend downward through valve body 23 into communication with a hollow joint member 52. Port 50 communicates with a plurality of channels 53 which extend downward in valve body 23 and then inward into communication with a bore 54 formed in the lower part of valve body 23 concentric with the bore in which pintle 21 is journaled. In order to prevent the high pressure in bore 54 from acting upon pintle 21, upper end of bore 54 is sealed as by means of a plug 55 threaded therein.

Leakage liquid which collects between plug 55 and the lower end of pintle 21 may escape through a duct 56 which extends radially therefrom into valve body 23 and then upward to the top of valve body 23. This liquid, and all other liquid which may drain onto the top of valve body 23, is permitted to escape through a drain groove 57 formed in the periphery of valve body 23 as shown in Figs. 5 and 8. Groove 57 also permits the pressure prevailing in the gas chamber to be communicated to the surface of the oil in the motive liquid reservoir, which surface will usually be at a lower level than valve body 23.

The lower end of valve body 23 and the upper end of joint member 52 are shaped to form a fluid tight spherical joint 60 therebetween. The lower end of joint member 52 forms a similar fluid tight spherical joint 61 with the upper end of a joint member 62 which is closely fitted in the upper part of a bore 63 formed in a support member 64 upon the axis of housing 1.

Support member 64 is closely fitted in the upper part of the third section 1ᶜ of the housing and in the lower part of a splice ring 65 and is supported therein by a pin 66 which is arranged in alined holes formed in splice ring 65 and in support member 64.

Splice ring 65 is closely fitted in the lower end of housing section 1ᵇ and in the upper end of housing section 1ᶜ and is fixed in position therein by a weld 67 which also joins the adjacent ends of sections 1ᵇ and 1ᶜ to each other.

Bore 63 communicates intermediate its ends with a suction passage 68ᵃ which extends through support member 64 and forms a part of a suction channel 68 through which pump C draws liquid from reservoir E. Bore 63 communicates at its lower end with a discharge passage 69ᵃ which extends through support member 64 and forms a part of a discharge channel 69 through which pump C delivers motive liquid to valve mechanism D.

Suction passage 68ᵃ communicates through joint members 62 and 52 with the suction channels 51 in valve body 23. Discharge passage 69ᵃ communicates with the bore 54 and the discharge channels 53 in valve body 23 through a tube 70 which is arranged in bore 63 concentric therewith and extends upward through joint members 62 and 52 into bore 54.

Tube 70 has a flange 71 arranged upon its lower end and engaged by a ring nut 72 which is threaded into the lower part of bore 63 and limits the upward movement of the tube 70, ring nut 72 forming a fluid tight joint with flange 71. The upper end of tube 70 is arranged within the bore 54 in valve body 23 and has a ring nut 73 threaded thereon and engaging a sealing ring 74 which is arranged in the lower end of bore 54 and forms a fluid tight joint with ring nut 73.

Valve body 23 is supported by a helical compression spring 75 which is arranged around tube 70 upon ring nut 72 and reacts against joint member 62, thereby supporting point member 62, joint member 52 and valve body 23. Spring 75 also holds ring nut 73 against sealing ring 74 and flange 71 against ring nut 72.

Ring nut 73 is tightened until passages 48 in pintle 21 are in alinement with ports 49 and 50 in valve body 23 at which time spring 75 is exerting sufficient force to maintain fluid tight joints between flange 71 and ring nut 72 and between ring nut 73 and sealing ring 74. Tube 70 is prevented from turning with nut 73 by a check ring 76 which is arranged in the bottom of bore 63 and provided with notches to receive projections formed on ring nut 72 and on flange 71. Ring nut 72 is prevented from rotating by inserting the end of spring 75 into a hole drilled partly in nut 72 and partly in support member 64.

Support member 64 has a drain pipe 77 attached thereto in communication with a drain passage 78$^a$ which extends through support member 64 and forms a part of a drain channel 78 through which liquid may drain from above support member 64 into reservoir E. Pipe 77 extends upward to a point above joint 60 so that oil leaking onto support member 64 must rise to a level above joint 60 before it can escape to reservoir E, thereby providing joints 60 and 61 with an oil seal which prevents any air from being drawn therethrough into pump C.

Figs. 9 to 33

Passages 68$^a$, 69$^a$ and 78$^a$ (Fig. 5) communicate, respectively, through expansion joints or thimbles 68$^b$, 69$^b$ and 78$^b$ with three passages 68$^c$, 69$^c$ and 78$^c$ formed in a valve body 81 (Fig. 9) which is arranged in housing section 1$^c$ immediately below support member 64. Each of the thimbles has one part thereof closely fitted in valve body 81 and the other part thereof closely fitted in support member 64.

Suction passage 68$^c$ and drain passage 78$^c$ extend downward through valve body 81 but discharge passage 69$^c$ terminates intermediate the ends thereof and communicates with valve mechanism D to enable pump C to deliver liquid thereto through port 50, passages 53, bore 54, tube 70 and discharge passage 69 (consisting of 69$^a$, 69$^b$ and 69$^c$).

Valve body 81 has formed therein a passage 82$^a$ which extends through the lower end thereof and forms part of a channel 82 through which motive liquid may flow to and from hydraulic motor F.

Passages 68$^c$, 78$^c$ and 82$^a$ are connected, respectively, through expansion joints or thimbles 68$^d$, 78$^d$ and 82$^b$ to three passages 68$^e$, 78$^e$ and 82$^c$ formed in an eccentric splice block 83 (Figs. 9 and 28) which has its end portions closely fitted in adjacent ends of housing sections 1$^c$ and 1$^d$ and joined thereto as by means of welds 84 and 85 respectively. Each of thimbles 68$^d$, 78$^d$ and 82$^b$ have one part thereof closely fitted in valve body 81 and the other part thereof closely fitted in splice block 83 to form a fluid tight joint therebetween.

Passage 68$^e$ extends downward through splice block 83 into communication with a suction pipe 68$^f$ which is fastened to splice block 83 and extends downward into reservoir E to enable pump C to draw liquid therefrom into its cylinders through suction channel 68 (consisting of 68$^a$, 68$^b$, 68$^c$, 68$^d$, 68$^e$ and 68$^f$), bore 63 in support member 64, joint members 62 and 52, passages 51, port 49 and passages 48.

Drain passage 78$^e$ extends downward through splice block 83 so that liquid from above support member 64 may drain into reservoir E through pipe 77 and drain channel 78 (consisting of 78$^a$, 78$^b$, 78$^c$, 78$^d$ and 78$^e$). Passage 82$^c$ extends downward into splice block 83 and then radially outward to the periphery thereof into communication with a channel 82$^d$ to be presently described.

Valve body 81 also has three passages 86$^a$, 87$^a$ and 88$^a$ formed therein. Passage 86$^a$ forms part of a channel 86 through which motive liquid is delivered to and discharged from motor F. Passages 87$^a$ and 88$^a$ form, respectively, parts of two channels 87 and 88 through which liquid flows from motor F into valve mechanism D to operate it.

Passage 86$^a$ (Figs. 20, 26 and 29) is connected through an expansion joint or thimble 86$^b$ to a passage 86$^c$ which extends downward into splice block 83 and then horizontally outward through the periphery thereof into communication with a channel 86$^d$ to be presently described. Passage 87$^a$ (Figs. 20, 25 and 29) and passage 88$^a$ (Figs. 20, 27 and 29) are connected, respectively, through expansion joints or thimbles 87$^b$ and 88$^b$ to two passages 87$^c$ and 88$^c$ which extend downward into splice block 83 and then horizontally outward through the periphery thereof into communication with channels 87$^d$ and 88$^d$ to be presently described.

In order to provide between the inside of casing 2 and the outside of housing 1 sufficient space for fluid channels through which motive liquid may flow to and from hydraulic motor F, the lower part of splice block 83 and the lower sections of housing 1 are made smaller in diameter than and are arranged eccentric to the upper part of splice block 83 and the upper sections of housing 1 as best shown in Figs. 29 and 32.

The lower end of housing section 1$^d$ and the upper end of the next lower section 1$^e$ have a splice ring 90 (Figs. 28 and 30) closely fitted therein and firmly joined thereto as by means of a weld 91. Splice ring 90 has its lower end sealed by a bulkhead 92 which is welded thereto and forms the bottom of reservoir E.

Figure 31:
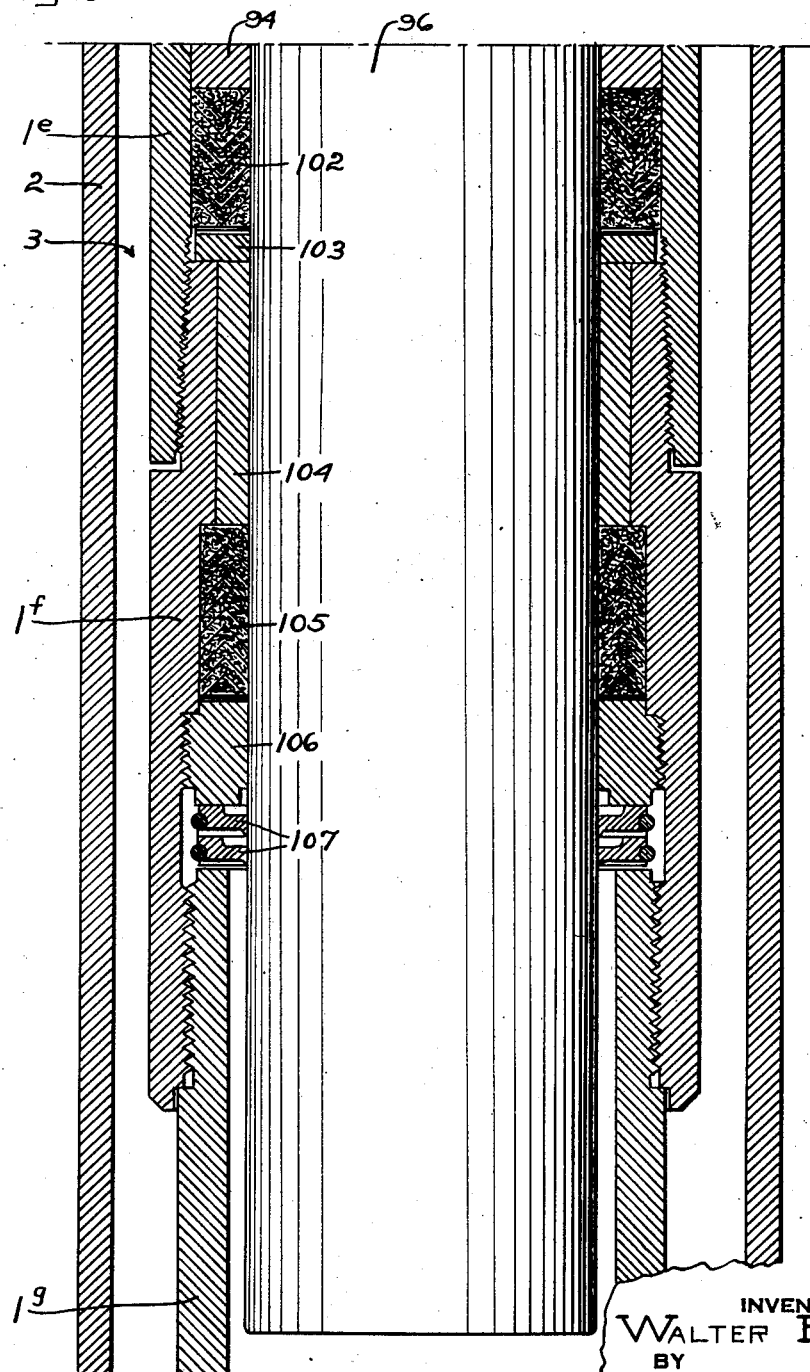
Fig. 31 is a central vertical section showing part of the crude oil pump, the view being a continuation of the view shown in Fig. 30.

Housing section 1$^e$ is counterbored for a short distance above its lower end to form an annular shoulder 93, and it has a packing ring 94 (Figs. 30 and 31) of non-ferrous metal closely fitted in its counterbored part and seated against shoulder 93. That part of housing 1$^e$ between bulkhead 92 and packing ring 94 forms the cylinder of hydraulic motor F and has a piston 95 fitted therein.

Housing section 1$^e$ is connected by a short housing section 1$^f$ to the lowermost housing section 1$^g$ which forms the barrel or cylinder of oil pump G and which, as shown schematically in Fig. 1, is connected by slip joint 4 to packer H. Housing section 1$^f$ has its upper part externally threaded and tightly screwed into the lower end of section 1$^e$ and its lower part internally threaded and tightly screwed onto the upper end of housing section 1$^g$.

Piston 95 is attached to a long rod 96 of substantial diameter which extends through packing ring 94 into housing section 1$^g$ and constitutes both the piston rod of motor F and the displacement member of pump G.

In order to prevent motive liquid from leaking out of motor F, suitable packing 102 is arranged below packing ring 94 and fills the space between rod 96 and the wall of section 1$^e$. A collar 103 encircles rod 96, engages the bottom of packing 102 and rests upon the upper end of section 1$^f$ so that, when section 1$^f$ is screwed into section 1$^e$, collar 103 will be raised and expand packing 102 into firm contact with rod 96 and the wall of section 1$^e$.

Rod 96 is guided by a guide ring 104 which is closely fitted thereon and in housing section 1$^f$ between collar 103 and a packing 105 which is arranged around rod 96 and expanded into firm contact therewith and with the wall of section 1$^f$ by a ring 106 threaded into section 1$^f$. Packing 105 seals the upper end of oil pump G and prevents crude oil from being carried by rod 96 into guide ring 104, the bulk of the crude oil adhering to rod 96 during its up stroke being removed therefrom by suitable scraper rings 107 arranged around rod 96 between ring 106 and the upper end of section 1ᵉ.

When hydraulic motor F moves rod 96 upward, crude oil will be drawn from the bottom of the well through valve 7 and passage 6 of packer H into housing section 1ᵉ and, when motor F forces rod 96 downward, valve 7 will close and crude oil will be expelled from section 1ᵉ through valve 8 into space 3. The enlarged or packing portion 9 of packer H will prevent oil from flowing downward out of space 3 so that continued reciprocation of rod 96 will cause crude oil to flow upward through space 3 and then out the upper end of casing 2.

Liquid for operating motor F and for causing automatic operation of valve mechanism D flows to and from the cylinder of motor F through four channels, 82ᵈ, 86ᵈ, 87ᵈ and 88ᵈ which are arranged upon the outside of housing sections 1ᵈ and 1ᵉ. As shown, each of these channels is formed by splitting a pipe lengthwise to form a half-pipe (Fig. 29) and welding the half-pipe to the outside of sections 1ᵈ and 1ᵉ with its lower end closed and welded to section 1ᵉ and its upper end abutting and welded to the shoulder 110 (Figs. 25, 26, 27, 32 and 33) which is formed upon splice block 83 at the junction of the concentric and eccentric parts thereof.

Channel 82ᵈ communicates at its upper end with passage 82ᶜ (Figs. 28, 29 and 32) in splice block 83 and at its lower end with a port 82ᵉ (Figs. 30 and 32) which is formed in the side wall of section 1ᵉ a short distance above packing ring 94. Port 82ᵉ communicates with a groove 111 which is formed in the wall of section 1ᵉ and functions as a dashpot to decelerate piston 95 at the end of its down stroke.

Channel 86ᵈ communicates at its upper end with passage 86ᶜ and at its lower end with a port 86ᵉ (Figs. 30 and 33) which is formed in the side wall of section 1ᵉ a short distance below bulkhead 92. Port 86ᵉ communicates with a groove 112 which is formed in the wall of section 1ᵉ and functions as a dashpot to decelerate piston 95 at the end of its up stroke.

Channel 87ᵈ communicates at its upper end with passage 87ᶜ (Figs. 25 and 29) and at its lower end with a port 87ᵉ (Figs. 30 and 32) which is formed in the side wall of housing section 1ᵉ a short distance below port 86ᵉ. Channel 88ᵈ communicates at its upper end with passage 88ᶜ (Figs. 27 and 29) and at its lower end with a port 88ᵉ (Fig. 30) which is formed in the side wall of housing section 1ᵉ a short distance above port 82ᵉ.

The arrangement is such that motive liquid from pump C directed through channel 82 will enter the lower end of the cylinder of motor F and raise piston 95 and rod 96 on a suction stroke, and piston 95 will exhaust liquid from the upper end of the motor cylinder through channel 86 to valve mechanism D.

Piston 95 will continue upward until it passes beyond port 87ᵉ and then the high pressure prevailing below piston 95 will extend through channel 87 and operate valve mechanism D to reverse the flow of liquid in channels 82 and 86, thereby stopping upward movement of piston 95 and causing it to move downward.

If piston 95 should overrun before the flow of liquid in channels 82 and 86 is reversed, it will cover port 86ᵉ and then it must expel liquid from the motor cylinder through the small groove 112 which will quickly and smoothly decelerate it to a complete stop. Then, upon reversal of flow in channels 82 and 86, motive liquid entering port 86ᵉ will pass through groove 112 and force piston 95 downward slowly until port 86ᵉ is uncovered and then piston 95 will move downward at full speed on a power stroke.

Piston 95 will continue downward until it passes beyond port 88ᵉ and then the high pressure prevailing above piston 95 will extend through channel 88 and operate valve mechanism D to reverse the flow in channels 82 and 86, thereby stopping the downward movement of piston 95 and causing it to move upward. If piston 95 should overrun port 82ᵉ, groove 111 will cause it to be gradually decelerated and then gradually accelerated in the same manner that it was decelerated and then accelerated at the end of its up stroke.

The flow of liquid to and from motor F is controlled by valve mechanism D which is shown in Figs. 9 to 27 and consists primarily of a reversing valve RV and a pilot valve PV arranged, respectively, in two bores 120 and 121 formed in valve body 81.

Figure 21:
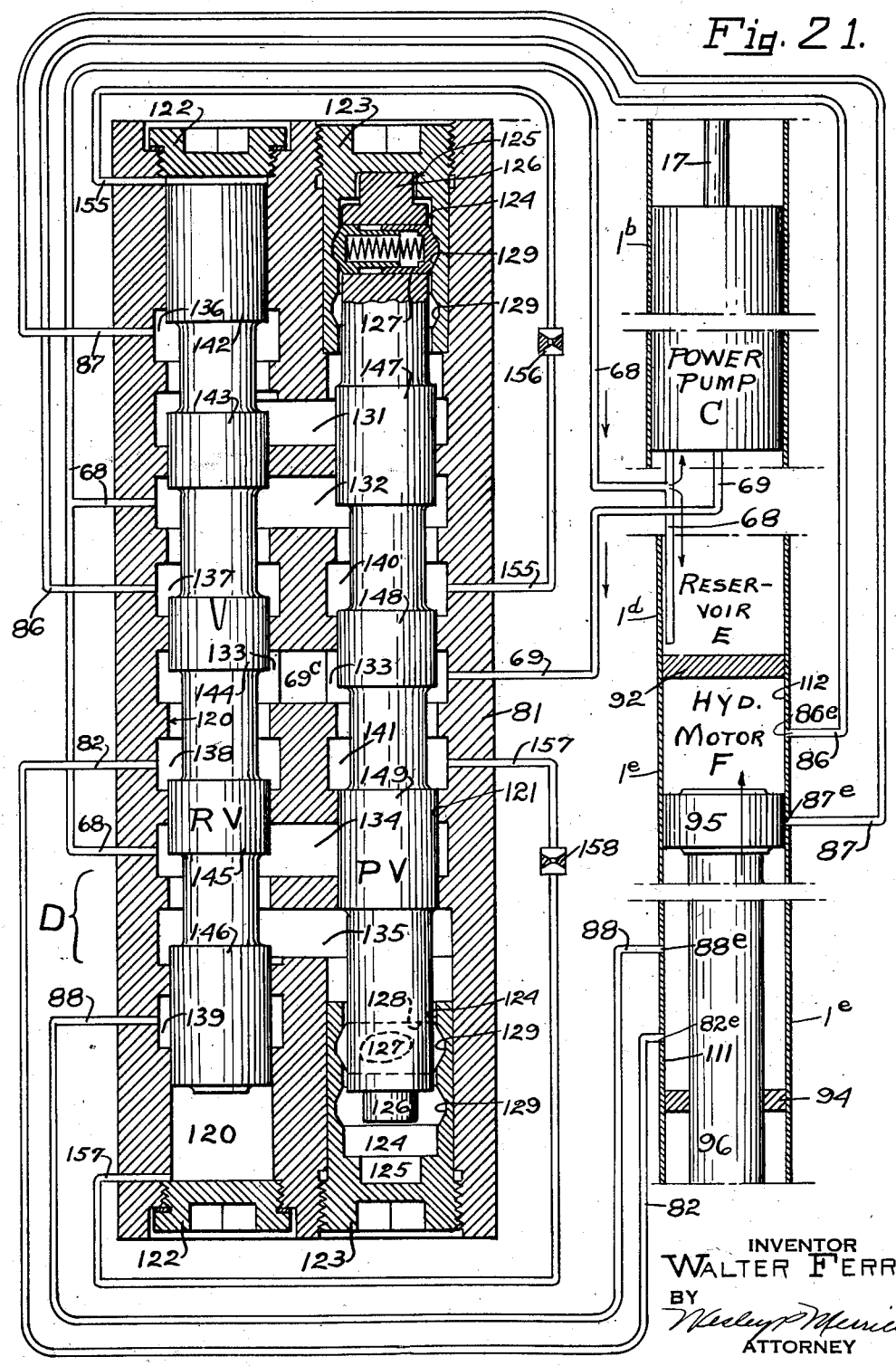
Fig. 21 is in part a section on the line 21—21 of Fig. 10, showing the pilot valve and the reversing valve in the positions occupied during an up-stroke of the hydraulic motor, and in part a diagram of the hydraulic circuit.

As shown in Figs. 21 to 23, bore 120 is closed at each of its ends by a plug 122. Bore 121 is enlarged at each of its ends and has a plug 123 closely fitted therein to close it. Plug 123 has formed therein an axial bore 124 which is somewhat larger than the body of the pilot valve so that liquid may flow from bore 121 into the end of bore 124 to shift the pilot valve. A recess 125 is formed in each plug 123 at the end of bore 124 to function as a dashpot for a projection 126 one of which is formed upon each end of the pilot valve and is somewhat smaller than recess 125.

Pilot valve PV is yieldingly retained in either one of two positions by two spring detents 127 arranged in holes 128 extending through the pilot valve near the ends thereof. For the purpose of illustrating the detent and to show the clearance between the periphery of the pilot valve and the wall of bore 124, the pilot valve has been rotated 90° in Fig. 23.

Each detent 127 consists of two hollow telescoping plungers which have a suitable spring arranged therein to urge them apart. The outer ends of each detent are tapered or convex and are adapted to engage either one of two complementary tapered or concave grooves 129 which are formed in the wall of the bore 124 in each plug 123.

Grooves 129 are so located that, when the pilot valve is shifted upward, the two detents 127 will enter the two upper grooves 129 and retain the pilot valve in its correct upper position and, when the pilot valve is shifted downward, the two detents 127 will enter the two lower grooves 129 and retain the pilot valve in its correct lower position.

Bores 120 and 121 are connected to each other by five spaced apart elliptical ports 131 (Fig. 12), 132 (Fig. 13), 133 (Fig. 15), 134 (Fig. 17) and 135 (Fig. 18) which are larger in diameter than bores 120 and 121 as shown in Fig. 21.

Bore 120 also has four other ports 136 (Fig. 11), 137 (Fig. 14), 138 (Fig. 16) and 139 (Fig. 19) formed in the wall thereof. Port 136 is arranged above port 131, port 137 is arranged between ports 132 and 133, port 138 is arranged between ports 133 and 134, and port 139 is arranged below port 135 as shown in Fig. 21. Bore 121 also has two substantially annular ports 140 (Fig. 14) and 141 (Fig. 16) formed in the wall thereof. Port 140 is arranged between ports 132 and 133, and port 141 is arranged between ports 133 and 134 as shown in Fig. 21.

Reversing valve RV is provided with five spaced apart heads or pistons 142, 143, 144, 145 and 146 which are closely fitted in bore 120 and control communication between adjacent ports formed therein, and pilot valve PV is provided with three spaced apart heads or pistons 147, 148 and 149 which are closely fitted in bore 121 and control communication between adjacent ports formed therein.

The channels to which the ports are connected are formed in valve body 81 parallel to the axes of the valves but, for the purpose of illustration, these channels have been shown diagrammatically in Figs. 21 to 23 in order that the flow of liquid may be readily traced.

Channel 68, through which pump C draws its supply of liquid, communicates with ports 132 and 134 (Figs. 9, 13 and 17) in order that liquid discharged from motor F may be returned direct to pump C and thereby reduce the amount of liquid that pump C must lift from reservoir E.

Figure 26:
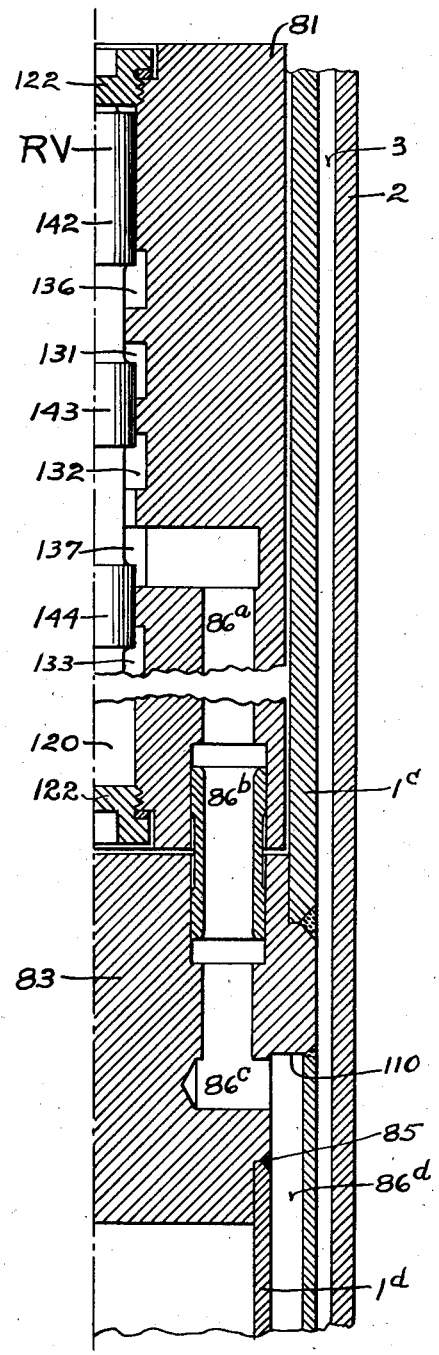
Fig. 26 is a vertical section taken on the irregular line 26—26 of Fig. 14.
Figure 27:
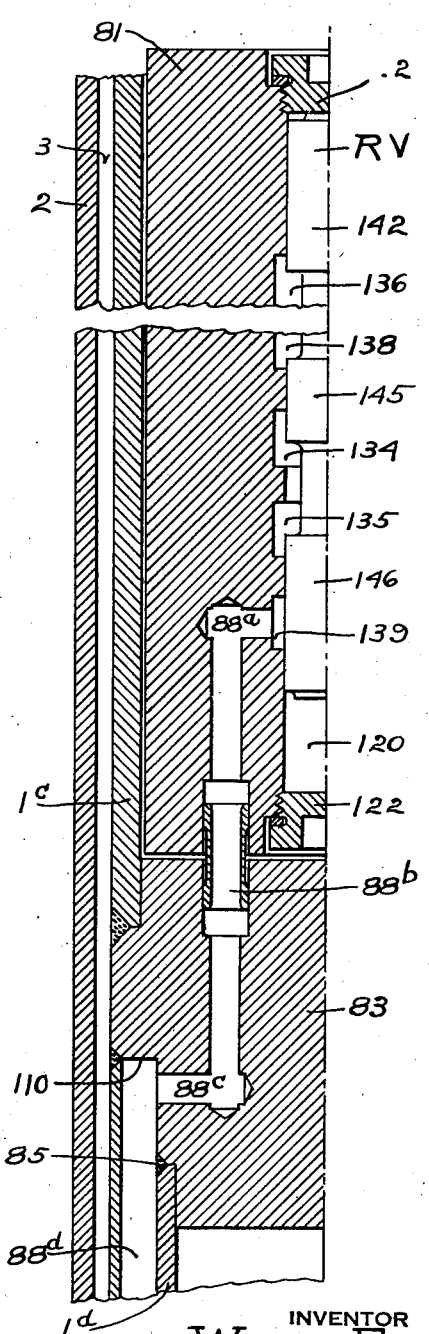
Fig. 27 is a vertical section taken on the irregular line 27—27 of Fig. 19.

Channel 69, into which pump C discharges its output, communicates with port 133 as shown in Figs. 9 and 15. Channel 82, through which liquid flows to and from the lower end of motor F, communicates with port 138 as shown in Figs. 9 and 16. Channel 86, through which liquid flows to and from the upper end of motor F, communicates with port 137 as shown in Figs. 14 and 26. Channel 87, through which liquid flows for reversing the valve at the end of an up-stroke of motor F, communicates with port 136 as shown in Figs. 11 and 25. Channel 88, through which liquid flows for reversing the valve at the end of a downstroke of motor F, communicates with port 139 as shown in Figs. 19 and 27.

Port 140 (Figs. 14, 21 and 24) communicates with a channel 155 which extends upward through valve body 81 and opens into the upper end of bore 120, as shown in Figs. 10 and 24, for the purpose of conducting liquid thereto to shift reversing valve RV downward. Channel 155 has a choke 156 (Fig. 14) arranged therein to limit the rate of flow therethrough and thereby limit the rate of movement of valve RV.

Port 141 (Figs. 16, 21 and 24) communicates with a channel 157 which extends downward through valve body 81 and opens into the lower end of bore 120, as shown in Figs. 20 and 24, for the purpose of conducting liquid thereto to shift reversing valve RV upward. Channel 157 has a choke 158 (Fig. 16) arranged therein to limit the rate of flow therethrough and thereby limit the rate of movement of valve RV.

Assuming that the several parts are in the positions indicated in Fig. 21 and that electric motor A is driving pump C, the apparatus will operate as follows:

Motive liquid discharged by pump C will flow through channel 69, port 133, bore 120, port 138 and channel 82 to the lower end of motor F and move piston 95 upward on a suction stroke, and piston 95 will expel liquid from the upper end of the motor cylinder through channel 86, port 137, bore 120, port 132 and channel 68 to pump C and reservoir E.

Since, due to the displacement of rod 96, liquid is being ejected from motor F at a rate faster than the rate at which pump C is delivering liquid thereto, all liquid in excess of pump requirements will discharge into reservoir E. The upper end of pilot valve PV is exposed, through channels to be presently described, to the pressure of the liquid discharged from motor F but this pressure is so low that detents 127 readily retain pilot valve PV in its upper position.

Piston 95 will continue to move upward until it passes port 87e and then high pressure liquid will flow through channel 87, port 136, bore 120, port 131 and bores 121 and 124 to the upper end of bore 124 and recess 125 where it will exert sufficient force upon the end of pilot valve PV to overcome the resistance of detents 127 and shift pilot valve PV downward to the position shown in Fig. 22.

Shifting the pilot valve to its lower position opens port 140 to port 133 so that motive liquid from channel 69 may flow therethrough and through channel 155 to the upper end of bore 120 and shift reversing valve RV downward to the position shown in Fig. 23.

Shifting valve RV to its lower position opens port 137 to port 133 and port 138 to port 134 so that liquid discharged by pump C will flow through channel 69, port 133, bore 120, port 137 and channel 86 to the upper end of motor F and move piston 95 downward on a power stroke, and piston 95 will expel liquid from the lower end of the motor cylinder through channel 82, port 138, bore 120, port 134 and channel 68 to pump C.

Since, due to the displacement of rod 96, liquid is being ejected from motor F at a rate considerably less than the rate that pump C is delivering liquid thereto, pump C must draw a part of its requirement from reservoir E. The lower end of pilot valve PV is exposed, through channels to be presently described, to the pressure of a liquid discharged from motor F but this pressure is so low that detents 127 readily retain pilot valve PV in its lower position.

Piston 95 will continue to move downward until it passes port 88e and then high pressure liquid will flow through channel 88, port 139, bore 120, port 135 and bores 121 and 124 to the lower end of bore 124 and recess 125 where it will exert sufficient force upon the end of pilot valve PV to overcome the resistance of detents 127 and shift pilot valve PV upward to the position shown in Fig. 21.

Shifting pilot valve PV to its upper position opens port 141 to port 133 so that motive liquid from channel 69 may flow therethrough and channel 157 to the lower end of bore 120 and shift reversing valve RV upward to the position shown in Fig. 21, thereby causing piston 95 to make another up stroke as previously explained.

The apparatus will continue to function in the above described manner and piston 95 will continue to reciprocate rod 96 to pump oil from the well until electric motor A is deenergized.

The apparatus herein described is susceptible of various modifications and adaptations without departing from the scope of the invention hereinafter claimed.

The invention is hereby claimed as follows:

1. A hydraulic transmission, adapted to be lowered into an oil well, comprising a reciprocating hydraulic motor, a pump having pistons and cylinders arranged in a rotatable cylinder barrel and means for causing reciprocation of said pistons during rotation of said cylinder barrel, a pump valve mechanism for controlling the flow of liquid to and from said pump cylinders, means including a control valve mechanism for directing liquid from said pump to opposite ends of said motor alternately and from opposite ends of said motor alternately to said pump to thereby effect operation of said motor, and a fluid tight housing joined to said motor and enclosing said pump and said valve mechanisms.

2. A hydraulic transmission, adapted to be lowered into an oil well, comprising a reciprocating hydraulic motor, a radial piston type pump having pistons and cylinders arranged in a rotatable cylinder barrel and means arranged around said cylinder barrel for causing reciprocation of said pistons during rotation of said cylinder barrel, a pump valve mechanism for controlling the flow of liquid to and from said pump cylinders, means including a control valve mechanism for directing liquid from said pump to opposite ends of said motor alternately and from opposite ends of said motor alternately to said pump to thereby effect operation of said motor, and a fluid tight housing joined to said motor and enclosing said pump and said valve mechanisms.

3. A hydraulic transmission, adapted to be lowered into an oil well, comprising a reciprocating hydraulic motor, a radial piston type pump having pistons and cylinders arranged in a rotatable cylinder barrel at an acute angle to the axis thereof and a cylindrical thrust member encircling said cylinder barrel eccentric thereto and engaging the outer end of each piston upon a single spot offset from the piston axis to cause rotation and reciprocation of said pistons during rotation of said cylinder barrel, a pump valve mechanism for controlling the flow of liquid to and from said pump cylinders, means including a control valve mechanism for directing liquid from said pump to opposite ends of said motor alternately and from opposite ends of said motor alternately to said pump to thereby effect operation of said motor, and a fluid tight housing joined to said motor and enclosing said pump and said valve mechanisms.

4. A hydraulic transmission, adapted to be lowered into an oil well, comprising a reciprocating hydraulic motor, a radial piston type pump having pistons and cylinders arranged in a rotatable cylinder barrel at an acute angle to the axis thereof and a cylindrical thrust member encircling said cylinder barrel eccentric thereto and engaging the outer end of each piston upon a single spot offset from the piston axis to cause rotation and reciprocation of said pistons during rotation of said cylinder barrel, means for rotatably supporting said thrust member, a pump valve mechanism for controlling the flow of liquid to and from said pump cylinders, means including a control valve mechanism for directing liquid from said pump to opposite ends of said motor alternately and from opposite ends of said motor alternately to said pump to thereby effect operation of said motor, and a fluid tight housing joined to said motor and enclosing said pump and said valve mechanisms.

5. A hydraulic transmission, comprising a fluid tight housing small enough in diameter to be lowered into an oil well, a hydraulic motor joined to said housing at the lower end thereof, a pump arranged in said housing and having pistons and cylinders arranged in a rotatable cylinder barrel and means for causing reciprocation of said pistons during rotation of said cylinder barrel, a valve block provided with ports and passages supported in said housing and so shaped that it may rock slightly therein, a rotary valve fastened to said cylinder barrel and journaled in said valve block for connecting said cylinders to said ports alternately, and means for directing liquid from said pump to opposite ends of said motor alternately and from opposite ends of said motor alternately to said pump including a control valve mechanism arranged within said housing.

6. A hydraulic transmission, comprising a fluid tight housing small enough in diameter to be lowered into an oil well, a hydraulic motor joined to said housing at the lower end thereof, a radial piston type pump arranged in said housing and having pistons and cylinders arranged in a rotatable cylinder barrel and means arranged around said cylinder barrel for causing reciprocation of said pistons during rotation of said cylinder barrel, a valve block provided with ports and passages supported in said housing and so shaped that it may rock slightly therein, a rotary valve fastened to said cylinder barrel and journaled in said valve block for connecting said cylinders to said ports alternately, and means for directing liquid from said pump to opposite ends of said motor alternately and from opposite ends of said motor alternately to said pump including a control valve mechanism arranged within said housing.

7. A hydraulic transmission, comprising a fluid tight housing small enough in diameter to be lowered into an oil well, a hydraulic motor joined to said housing at the lower end thereof, a radial piston type pump arranged in said housing and having pistons and cylinders arranged in a rotatable cylinder barrel at an acute angle to the axis thereof and a cylindrical thrust member encircling said cylinder barrel eccentric thereto and engaging the outer end of each piston upon a single spot offset from the piston axis to cause rotation and reciprocation of said pistons during rotation of said cylinder barrel, a valve block provided with ports and passages supported in said housing and so shaped that it may rock slightly therein, a rotary valve fastened to said cylinder barrel and journaled in said valve block for connecting said cylinders to said ports alternately, and means for directing liquid from said pump to opposite ends of said motor alternately and from opposite ends of said motor alternately to said pump including a control valve mechanism arranged within said housing.

8. A hydraulic transmission, comprising a fluid tight housing small enough in diameter to be lowered into an oil well, a hydraulic motor joined to said housing at the lower end thereof, a radial piston type pump arranged in said housing and having pistons and cylinders arranged in a rotatable cylinder barrel at an acute angle to the axis thereof and a cylindrical thrust member encircling said cylinder barrel eccentric thereto and engaging the outer end of each piston upon a single spot offset from the piston axis to cause rotation and reciprocation of said pistons during rotation of said cylinder barrel, means for rotatably supporting said thrust member, a valve block provided with ports and passages supported in said housing and so shaped that it may rock slightly therein, a rotary valve fastened to said cylinder barrel and journaled in said valve block for connecting said cylinders to said ports alternately, and means for directing liquid from said pump to opposite ends of said motor alternately and from opposite ends of said motor alternately to said pump including a control valve mechanism arranged within said housing.

9. The combination, with a reciprocating hydraulic motor, of a small diameter cylindrical housing fastened to said motor at one end thereof, a radial piston type pump arranged within said housing and having cylinders and pistons arranged in a rotatable cylinder barrel and means arranged around said cylinder barrel for causing reciprocation of said pistons during rotation of said cylinder barrel, a valve block provided with ports and passages arranged in said housing and so shaped that it may rock slightly therein, a rotary valve fastened to said cylinder barrel and journaled in said valve block for connecting the pump cylinders to said ports alternately, a support member fixed in said housing below said valve block, universal joint members supporting said valve block from said support member and permitting said valve block to adjust itself upon said rotary valve, said joint members forming a channel in communication with at least one of the passages in said valve block, and means for directing liquid from said pump to opposite ends of said motor alternately and from opposite ends of said motor alternately to said pump.

10. The combination, with a reciprocating hydraulic motor, of a small diameter cylindrical housing fastened to said motor at one end thereof, a radial piston type pump arranged within said housing and having cylinders and pistons arranged in a rotatable cylinder barrel at an acute angle to the axis thereof and a cylindrical thrust member encircling said cylinder barrel eccentric thereto and engaging the outer end of each piston upon a single spot offset from the piston axis to cause rotation and reciprocation of said pistons during rotation of said cylinder barrel, a valve block provided with ports and passages arranged in said housing and so shaped that it may rock slightly therein, a rotary valve fastened to said cylinder barrel and journaled in said valve block for connecting the pump cylinders to said ports alternately, a support member fixed in said housing below said valve block, universal joint members supporting said valve block from said support member and permitting said valve block to adjust itself upon said rotary valve, said joint members forming a channel in communication with at least one of the passages in said valve block, and means for directing liquid from said pump to opposite ends of said motor alternately and from opposite ends of said motor alternately to said pump.

11. The combination, with a reciprocating hydraulic motor, of a small diameter cylindrical housing fastened to said motor at one end thereof, a radial piston type pump arranged within said housing and having cylinders and pistons arranged in a rotatable cylinder barrel at an acute angle to the axis thereof and a cylindrical thrust member encircling said cylinder barrel eccentric thereto and engaging the outer end of each piston upon a single spot offset from the piston axis to cause rotation and reciprocation of said pistons during rotation of said cylinder barrel, means for rotatably supporting said thrust member, a valve block provided with ports and passages arranged in said housing and so shaped that it may rock slightly therein, a rotary valve fastened to said cylinder barrel and journaled in said valve block for connecting the pump cylinders to said ports alternately, a support member fixed in said housing below said valve block, universal joint members supporting said valve block from said support member and permitting said valve block to adjust itself upon said rotary valve, said joint members forming a channel in communication with at least one of the passages in said valve block, and means for directing liquid from said pump to opposite ends of said motor alternately and from opposite ends of said motor alternately to said pump.

12. A hydraulic transmission, comprising a cylindrical housing, an eccentric sleeve arranged within said housing, a cylindrical thrust member arranged within said sleeve eccentric to said housing, a rotatable cylinder barrel arranged within said thrust member concentric with said housing and provided with a plurality of cylinders, means for rotatably supporting said cylinder barrel, a piston fitted in each cylinder and having its outer end during rotation of said cylinder barrel engaging the inner surface of said thrust member, valve means for controlling the flow of liquid to and from said cylinders, a reciprocating hydraulic motor joined to said housing at one end thereof, and means for directing liquid from said pump valve means to opposite ends of said motor alternately and from opposite ends of said motor alternately to said pump including a control valve mechanism arranged within said housing.

13. A hydraulic transmission, comprising a cylindrical housing, an eccentric sleeve arranged within said housing, a cylindrical thrust member arranged within said sleeve eccentric to said housing, a rotatable cylinder barrel arranged within said thrust member concentric with said housing and provided with a plurality of cylinders, means carried by said sleeve for rotatably supporting said cylinder barrel, a piston fitted in each cylinder and having its outer end during rotation of said cylinder barrel engaging the inner surface of said thrust member, valve means for controlling the flow of liquid to and from said cylinders, a reciprocating hydraulic motor joined to said housing at one end thereof, and means for directing liquid from said pump to opposite ends of said motor alternately and from opposite ends of said motor alternately to said pump including a control valve mechanism arranged within said housing.

14. A hydraulic transmission, comprising a cylindrical housing, an eccentric sleeve arranged within said housing, a cylindrical thrust member arranged within said sleeve eccentric to said housing, a rotatable cylinder barrel arranged within said thrust member concentric with said housing and provided with a plurality of cylinders which are inclined to the radii of said cylinder barrel, means for rotatably supporting said cylinder barrel, a piston fitted in each cylinder and having its outer end during rotation of said cylinder barrel engaging the inner surface of said thrust member upon a single spot which is offset from the piston axis, valve means for controlling the flow of liquid to and from said cylinders, a reciprocating hydraulic motor joined to said housing at one end thereof, and means for directing liquid from said pump to opposite ends of said motor alternately and from opposite ends of said motor alternately to said pump including a control valve mechanism arranged within said housing.

15. A hydraulic transmission, comprising a reciprocating hydraulic motor adapted to be arranged in a vertical position, a small diameter cylindrical housing conected to said motor at the upper end thereof, a rotary pump arranged within said housing and including a pump valve consisting primarily of a rotary valve member and a non-rotatable valve block having coacting ports and passages, said valve block being so shaped that it may rock slightly in said housing, valve means arranged within said housing between said pump and said motor for controlling the flow of liquid therebetween, a support member fixed in said housing below said valve block, and universal joint members supporting said valve block from said support member and forming a channel in communication with at least one of the passages in said valve block, said joint members permitting said valve block to adjust itself upon said rotary valve member.

16. A hydraulic transmission, comprising a cylindrical housing, an eccentric sleeve arranged within said housing, a cylindrical thrust member arranged within said sleeve eccentric to said housing, means for rotatably supporting said thrust member a rotatable cylinder barrel arranged within said thrust member concentric with said housing and provided with a plurality of cylinders which are inclined to the radii of said cylinder barrel, means carried by said sleeve for rotatably supporting said cylinder barrel, a piston fitted in each cylinder and having its outer end during rotation of said cylinder barrel engaging the inner surface of said thrust member upon a single spot which is offset from the piston axis, valve means for controlling the flow of liquid to and from said cylinders, a reciprocating hydraulic motor joined to said housing at one end thereof, and means for directing liquid from said pump to opposite ends of said motor alternately and from opposite ends of said motor alternately to said pump including a control valve mechanism arranged within said housing.

17. A hydraulic transmission, comprising a cylindrical housing, an eccentric sleeve arranged within said housing, a cylindrical thrust member arranged within said sleeve eccentric to said housing, a rotatable cylinder barrel arranged within said thrust member concentric with said housing and provided with a plurality of cylinders, means for rotatably supporting said cylinder barrel, a piston fitted in each cylinder and having its outer end during rotation of said cylinder barrel engaging the inner surface of said thrust member, a valve block provided with ports and passages arranged within said housing below said sleeve and so shaped that it may rock slightly therein, a rotary valve fastened to said cylinder barrel and journaled in said valve block for connecting said cylinders to said ports alternately, a reciprocating hydraulic motor joined to said housing at one end thereof, and means for directing liquid from said pump to opposite ends of said motor alternately and from opposite ends of said motor alternately to said pump including a control valve mechanism arranged within said housing.

18. A hydraulic transmission, comprising a cylindrical housing, an eccentric sleeve arranged within said housing, a cylindrical thrust member arranged within said sleeve eccentric to said housing, a rotatable cylinder barrel arranged within said thrust member concentric with said housing and provided with a plurality of cylinders, means carried by said sleeve for rotatably supporting said cylinder barrel, a piston fitted in each cylinder and having its outer end during rotation of said cylinder barrel engaging the inner surface of said thrust member, a valve block provided with ports and passages arranged within said housing below said sleeve and so shaped that it may rock slightly therein, a rotary valve fastened to said cylinder barrel and journaled in said valve block for connecting said cylinders to said ports alternately, a reciprocating hydraulic motor joined to said housing at one end thereof, and means for directing liquid from said pump to opposite ends of said motor alternately and from opposite ends of said motor alternately to said pump including a control valve mechanism arranged within said housing.

19. A hydraulic transmission, comprising a cylindrical housing, an eccentric sleeve arranged within said housing, a cylindrical thrust member arranged within said sleeve eccentric to said housing, a rotatable cylinder barrel arranged within said thrust member concentric with said housing and provided with a plurality of cylinders which are inclined to the radii of said cylinder barrel, means for rotatably supporting said cylinder barrel, a piston fitted in each cylinder and having its outer end during rotation of said cylinder barrel engaging the inner surface of said thrust member upon a single spot which is offset from the piston axis, a valve block provided with ports and passages arranged within said housing below said sleeve and so shaped that it may rock slightly therein, a rotary valve fastened to said cylinder barrel and journaled in said valve block for connecting said cylinders to said ports alternately, a reciprocating hydraulic motor joined to said housing at one end thereof, and means for directing liquid from said pump to opposite ends of said motor alternately and from opposite ends of said motor alternately to said pump including a control valve mechanism arranged within said housing.

20. A hydraulic transmission, comprising a cylindrical housing, an eccentric sleeve arranged within said housing, a cylindrical thrust member arranged within said sleeve eccentric to said housing, means for rotatably supporting said thrust member, a rotatable cylinder barrel arranged within said thrust member concentric with said housing and provided with a plurality of cylinders which are inclined to the radii of said cylinder barrel, means carried by said sleeve for rotatably supporting said cylinder barrel, a piston fitted in each cylinder and having its outer end during rotation of said cylinder barrel engaging the inner surface of said thrust member upon a single spot which is offset from the piston axis, a valve block provided with ports and passages arranged within said housing below said sleeve and so shaped that it may rock slightly therein, a rotary valve fastened to said cylinder barrel and journaled in said valve block for connecting said cylinders to said ports alternately, a reciprocating hydraulic motor joined to said housing at one end thereof, and means for directing liquid from said pump to opposite ends of said motor alternately and from opposite ends of said motor alternately to said pump including a control valve mechanism arranged within said housing.

WALTER FERRIS.